US012737086B2

(12) United States Patent
Jain et al.

(10) Patent No.: US 12,737,086 B2
(45) Date of Patent: Sep. 15, 2026

(54) TOUCH SENSOR PANEL WITH REDUCED DIMENSIONS

(71) Applicant: Apple Inc., Cupertino, CA (US)

(72) Inventors: Karan S. Jain, San Jose, CA (US); Eric E. Gemnay, San Francisco, CA (US); Sung Yul Chu, San Jose, CA (US); Ming-Ling Yeh, Cupertino, CA (US); Abhilash Goyal, Fremont, CA (US); Jigar M. Patel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 18/892,135

(22) Filed: Sep. 20, 2024

(65) Prior Publication Data

US 2025/0103169 A1 Mar. 27, 2025

Related U.S. Application Data

(60) Provisional application No. 63/585,301, filed on Sep. 26, 2023.

(51) Int. Cl.
*G06F 3/044* (2006.01)
*G06F 3/041* (2006.01)

(52) U.S. Cl.
CPC ........ *G06F 3/0445* (2019.05); *G06F 3/04144* (2019.05); *G06F 3/04164* (2019.05)

(58) Field of Classification Search
CPC ............... G06F 3/0445; G06F 3/04144; G06F 3/04164; G06F 3/0446; G06F 2203/04105; G06F 2203/04107
See application file for complete search history.

(56) References Cited

U.S. PATENT DOCUMENTS 8,633,916 B2 1/2014 Bernstein et al.
9,122,901 B2 9/2015 Slgedal et al.
(Continued)

FOREIGN PATENT DOCUMENTS

CN 210639594 U 5/2020
CN 112732116 A 4/2021
(Continued)

OTHER PUBLICATIONS

Non-Final Office Action received for U.S. Appl. No. 18/352,188, mailed on May 3, 2024, 20 pages.
(Continued)

*Primary Examiner* — Jonathan A Boyd
(74) *Attorney, Agent, or Firm* — Kubota & Basol LLP

(57) ABSTRACT

Disclosed herein is a touch sensor panel including a substrate, a plurality of conductive layers including a first conductive layer and a second conductive layer, a plurality of vias from the first conductive layer to the second conductive layer, and control circuitry mounted to a printed circuit. The control circuitry can include touch sensing circuitry. The first conductive layer can include a plurality of touch electrodes. The second conductive layer can be separated from the substrate by at least the first conductive layer and can include a bonding region with a plurality of bond pads for interconnection with the plurality of touch electrodes. The printed circuit can be separated from the substrate by at least the plurality of conductive layers and can be bonded to the plurality of bond pads by a conductive bonding material between the second conductive layer and the printed circuit.

20 Claims, 12 Drawing Sheets

(56) References Cited

U.S. PATENT DOCUMENTS

| | | | |
|---|---|---|---|
| 9,870,033 B1 | 1/2018 | Browning et al. | |
| 10,095,339 B1 | 10/2018 | Tsai et al. | |
| 10,331,178 B2 | 6/2019 | Shah et al. | |
| 10,809,784 B2 | 10/2020 | Yamazaki et al. | |
| 10,901,543 B1 | 1/2021 | Bayat et al. | |
| 10,990,222 B2 | 4/2021 | Wang et al. | |
| 11,157,101 B2 | 10/2021 | Wang | |
| 11,209,864 B2 | 12/2021 | Tan et al. | |
| 11,574,971 B2 | 2/2023 | Lee et al. | |
| 12,321,556 B1 | 6/2025 | Jain et al. | |
| 2015/0009422 A1 | 1/2015 | Tung | |
| 2015/0193059 A1 | 7/2015 | Reynolds et al. | |
| 2015/0201487 A1 | 7/2015 | Kee et al. | |
| 2018/0136773 A1* | 5/2018 | Chen | G02F 1/134309 |
| 2018/0315735 A1 | 11/2018 | Delacruz et al. | |
| 2019/0102011 A1* | 4/2019 | Schultz | G06F 3/04164 |
| 2020/0133409 A1 | 4/2020 | Tanemura | |
| 2020/0201482 A1 | 6/2020 | Weisse et al. | |
| 2021/0132724 A1 | 5/2021 | Kwon et al. | |
| 2021/0141491 A1 | 5/2021 | Gogte et al. | |
| 2021/0326004 A1 | 10/2021 | Park et al. | |
| 2021/0408410 A1 | 12/2021 | Chen et al. | |
| 2022/0050554 A1 | 2/2022 | Feng et al. | |
| 2022/0083162 A1 | 3/2022 | Xu | |
| 2022/0100315 A1 | 3/2022 | Yu et al. | |
| 2022/0129093 A1 | 4/2022 | Lin et al. | |
| 2022/0132659 A1 | 4/2022 | Seo | |
| 2022/0342498 A1 | 10/2022 | Wang et al. | |
| 2023/0108868 A1 | 4/2023 | Go et al. | |

FOREIGN PATENT DOCUMENTS

| | | |
|---|---|---|
| CN | 111930274 B | 5/2022 |
| CN | 218547962 U | 6/2022 |
| WO | 2023071639 A1 | 5/2023 |

OTHER PUBLICATIONS

Notice of Allowance received for U.S. Appl. No. 18/352,188, mailed on Feb. 10, 2025, 6 pages.

Final Office Action received for U.S. Appl. No. 18/352,188, mailed on Sep. 30, 2024, 21 pages.

* cited by examiner

TOUCH SENSOR PANEL WITH REDUCED DIMENSIONS

CROSS-REFERENCE TO RELATED APPLICATIONS

This application claims the benefit of U.S. Provisional Application No. 63/585,301, filed Sep. 26, 2023, the content of which is herein incorporated by reference in its entirety for all purposes.

FIELD OF THE DISCLOSURE

This relates generally to touch and/or force sensor panel stack-ups, and more particularly, to stack-ups with reduced form factor.

BACKGROUND OF THE DISCLOSURE

Many types of input devices are presently available for performing operations in a computing system, such as buttons or keys, mice, trackballs, joysticks, touch sensor panels, touch screens, touch pads, track pads, and the like. Touch sensor panels, touch screens, touch pads, and track-pads ("touch sensor panel(s)" or "touch screen(s)" or "touch screen/panel(s)"), in particular, are popular because of their ease and versatility of operation as well as their declining price. Some touch screens can include a touch sensor panel, including a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can interpret the touch in accordance with the display appearing at the time of the touch to perform one or more actions based on the touch. For example, some touch screens can include touch sensor panels such as capacitive touch sensor panels, and the like. Some capacitive touch sensor panels include touch sensor arrays based on various arrangements of capacitive touch electrodes. When the finger of a user or other external object is brought into the vicinity of the touch electrodes in the array, resulting capacitance changes of the touch electrodes in the vicinity of the object can be detected. The computing system can locate the finger or other object within the array based on the locations of the touch electrodes with which the changes are associated to perform the actions.

Some capacitive touch sensor electrodes can be interconnected with control circuitry using interconnect lines formed on the same substrate on which the capacitive touch sensor electrodes are formed. For example, capacitive electrodes and associated interconnect paths may be formed by screen printing silver ink patterns onto a touch sensor substrate. Capacitive touch sensor panels can be formed by a matrix of partially or fully transparent or non-transparent conductive plates (e.g., touch electrodes) made of materials such as Indium Tin Oxide (ITO). Due in part to their substantial transparency, capacitive touch sensor panels can be overlaid on a display to form a touch screen. For example, some touch screens can be formed by at least partially integrating touch sensing circuitry into a display pixel stack-up (e.g., the stacked material layers forming the display pixels).

SUMMARY OF THE DISCLOSURE

This relates generally to touch and/or force sensor panel stack-ups, and more particularly, to stack-ups with reduced form factor. In some instances, a touch sensor panel includes a substrate, a plurality of conductive layers including a first conductive layer and a second conductive layer, a plurality of vias from the first conductive layer to the second conductive layer, and control circuitry mounted to a printed circuit. The control circuitry can include touch sensing circuitry. The first conductive layer can include a plurality of touch electrodes. The second conductive layer can be separated from the substrate by at least the first conductive layer and can include a bonding region with a plurality of bond pads for interconnection with the plurality of touch electrodes. The printed circuit can be separated from the substrate by at least the plurality of conductive layers and can be bonded to the plurality of bond pads by a conductive bonding material between the second conductive layer and the printed circuit. In some instances, the plurality of touch electrodes can be interconnected with the touch sensing circuitry through the plurality of vias and the plurality of bond pads. In some instances, the plurality of conductive layers can include a third conductive layer between the first conductive layer and the second conductive layer. In some instances, the plurality of vias from the first conductive layer to the second conductive layer can include a first plurality of vias from the first conductive layer to the third conductive layer and a second plurality of vias from the second conductive layer to the third conductive layer. In some instances, an internal ground layer such as a grounding shield located in a border area of the panel enables internal interconnection between the sensing circuitry and the electrodes (e.g., including touch electrodes, force electrodes, etc.).

DETAILED DESCRIPTION

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

This relates generally to touch and/or force sensor panel stack-ups, and more particularly, to stack-ups with reduced form factor. In some instances, a touch sensor panel includes a substrate, a plurality of conductive layers including a first conductive layer and a second conductive layer, a plurality of vias from the first conductive layer to the second conductive layer, and control circuitry mounted to a printed circuit. The control circuitry can include touch sensing circuitry. The first conductive layer can include a plurality of touch electrodes. The second conductive layer can be separated from the substrate by at least the first conductive layer and can include a bonding region with a plurality of bond pads for interconnection with the plurality of touch electrodes. The printed circuit can be separated from the substrate by at least the plurality of conductive layers and can be bonded to the plurality of bond pads by a conductive bonding material between the second conductive layer and the printed circuit. In some instances, the plurality of touch electrodes can be interconnected with the touch sensing circuitry through the plurality of vias and the plurality of bond pads. In some instances, the plurality of conductive layers can include a third conductive layer between the first conductive layer and the second conductive layer. In some instances, the plurality of vias from the first conductive layer to the second conductive layer can include a first plurality of vias from the first conductive layer to the third conductive layer and a second plurality of vias from the second conductive layer to the third conductive layer. In some instances, an internal ground layer such as a grounding shield located in a border area of the panel enables internal interconnection between the sensing circuitry and the electrodes (e.g., including touch electrodes, force electrodes, etc.).

Figures 1A, 1B, 1C, 1D, 1E:
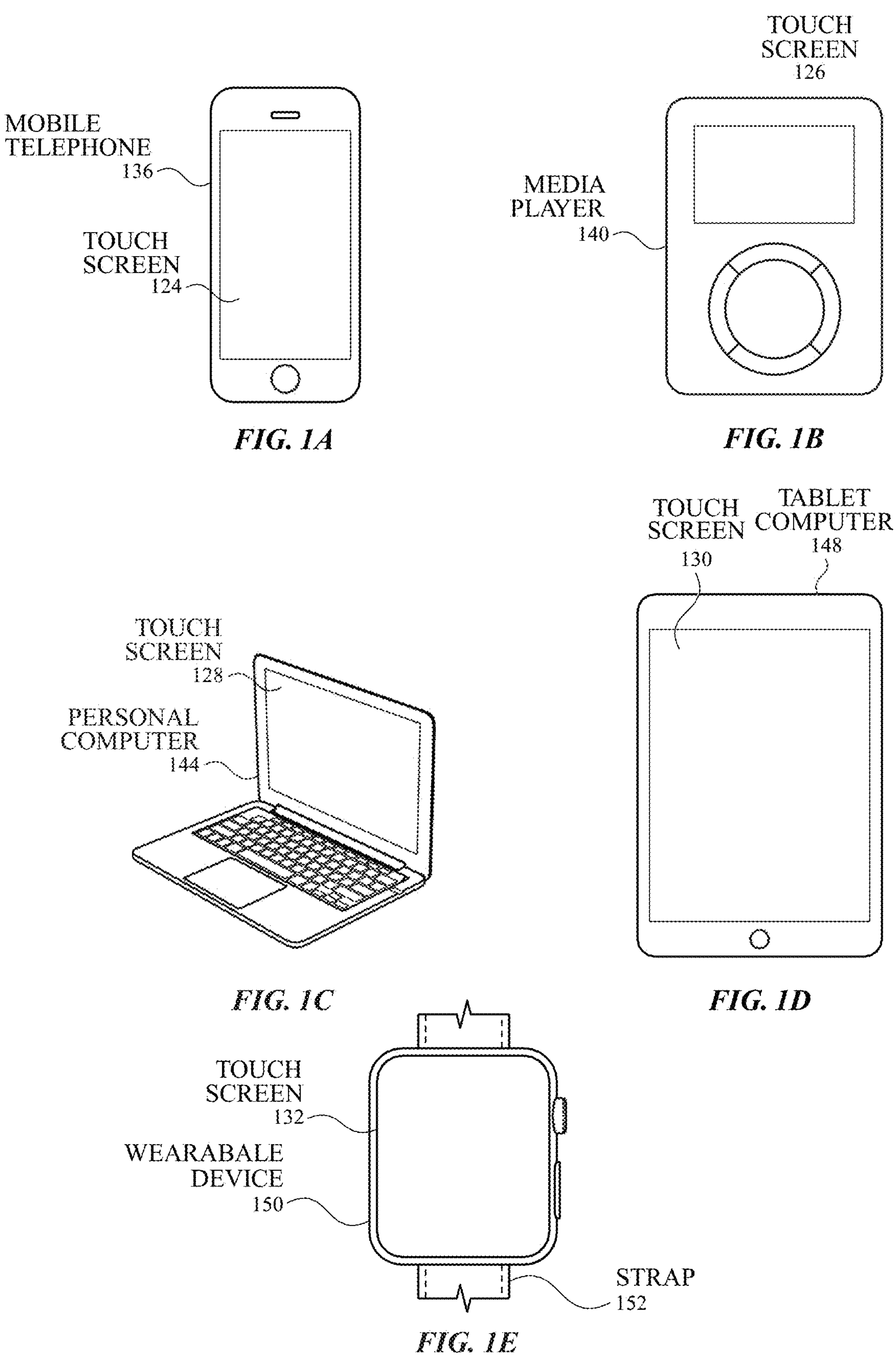
FIGS. 1A-1E illustrate touch sensing devices or systems that can include a touch screen or touch sensor panel according to examples of the disclosure.

FIGS. 1A-1E illustrate touch sensing devices or systems that can include a touch screen or touch sensor panel according to examples of the disclosure. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It should be understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures. Touch screens 124, 126, 128, 130 and 132 can be multi-touch touch screens that can detect multiple objects.

In some instances, touch screens 124, 126, 128, 130 and 132 and touch sensor panels can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it should be understood that, in some instances, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some instances, the touch node electrodes of a self-capacitance based touch system can be formed from rows and columns of conductive material, and changes in the self-capacitance to ground of the rows and columns can be detected, similar to above. In some instances, a touch screen/panel can be multi-touch, single touch, projection scan, full-imaging multi-touch, capacitive touch, etc.

In some instances, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some instances, a mutual capacitance based touch system can form touch nodes from a matrix of small, individual plates of conductive material.

In some instances, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 412 in touch screen/panel 410 in FIG. 4B) or as drive lines and sense lines (e.g., as in row touch electrodes 402 and column touch electrodes 404 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some instances, some of the electrodes can be configured to sense mutual capacitance therebetween and some of the electrodes can be configured to sense self-capacitance thereof.

Figure 2:
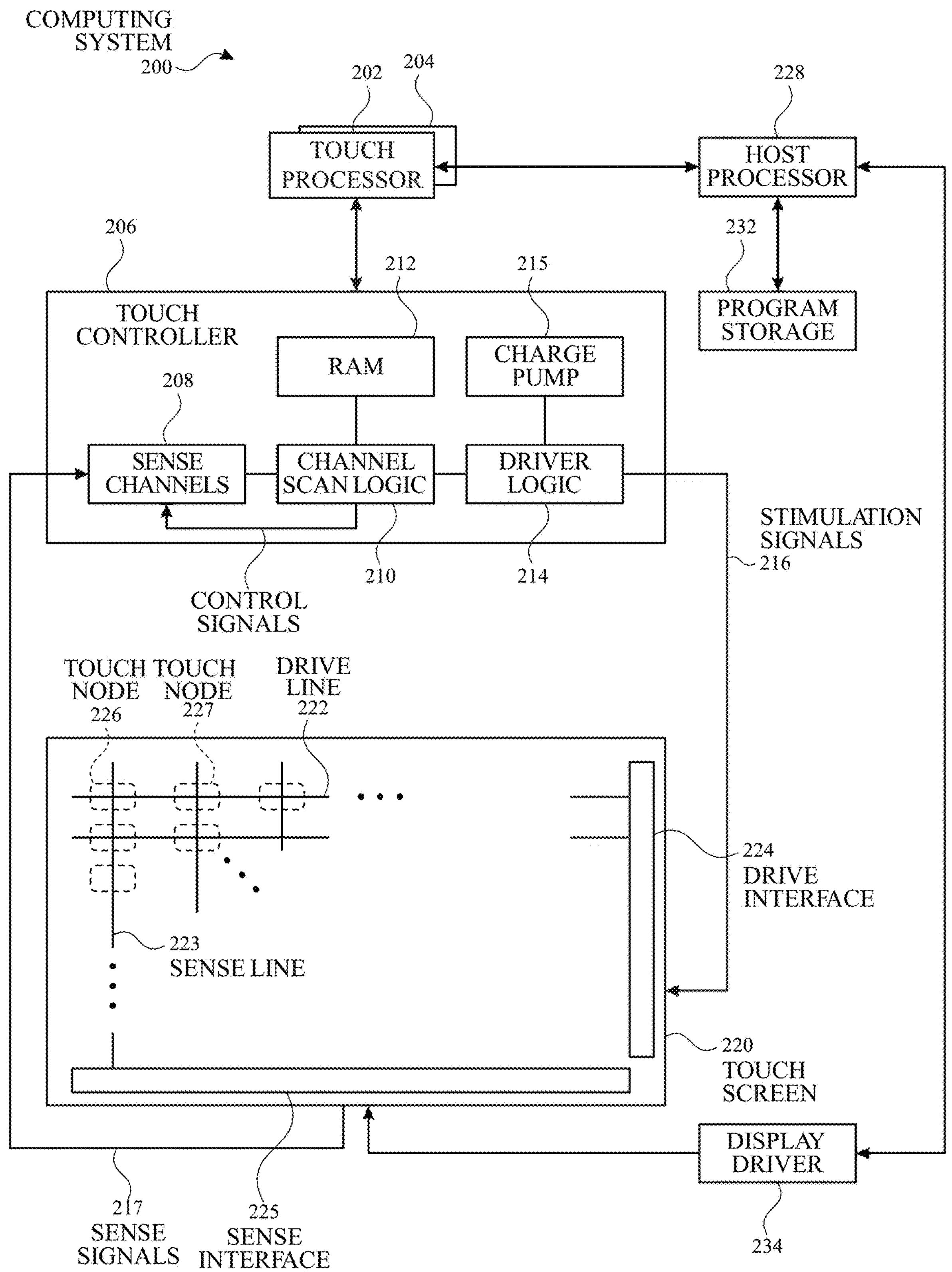
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can include a reduced thickness touch screen or touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some instances, touch controller 206, touch processor 202 and peripherals 204 can be integrated into a single application specific integrated circuit (ASIC), and in some instances can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. In some instances, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It should be understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some instances, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
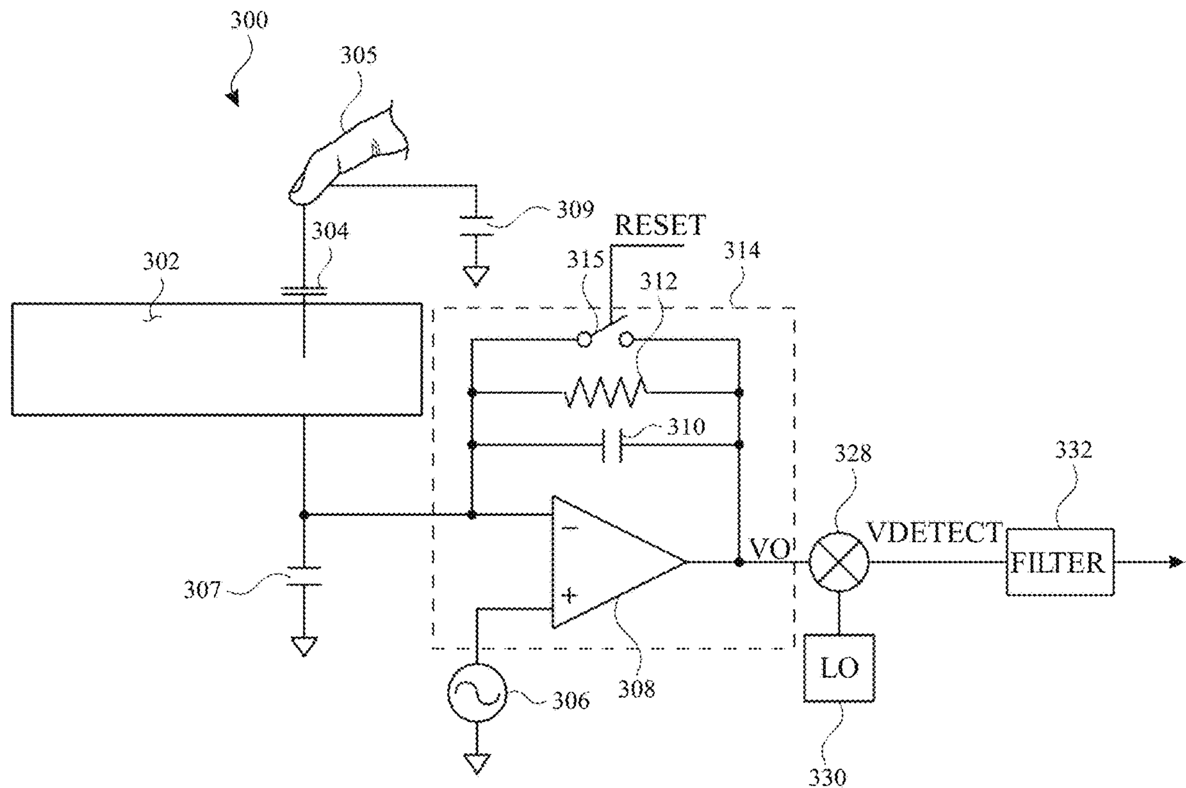
FIG. 3A illustrates a touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 402 or 404 of touch screen/panel 400 or a touch node electrodes 412 of touch screen/panel 410. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
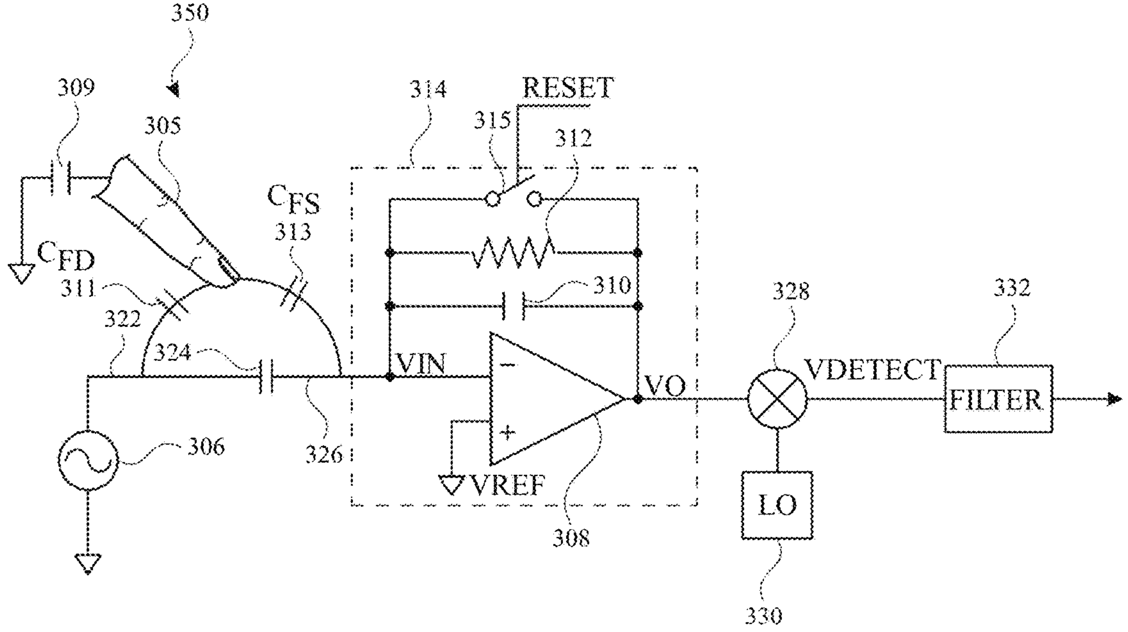
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and sense line 326. When a finger 305 or object approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, "substantially equal" can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters (not shown) can be employed: one before the multiplier and one after the multiplier. In some instances, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC) (not shown), and blocks 328, 332 and 330 may be implemented in a digital fashion (e.g., multiplier 328 can include a digital demodulator, 332 can include a digital filter, and local oscillator 330 can include a digital NCO (Numerical Controlled Oscillator).

Referring back to FIG. 2, in some instances, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
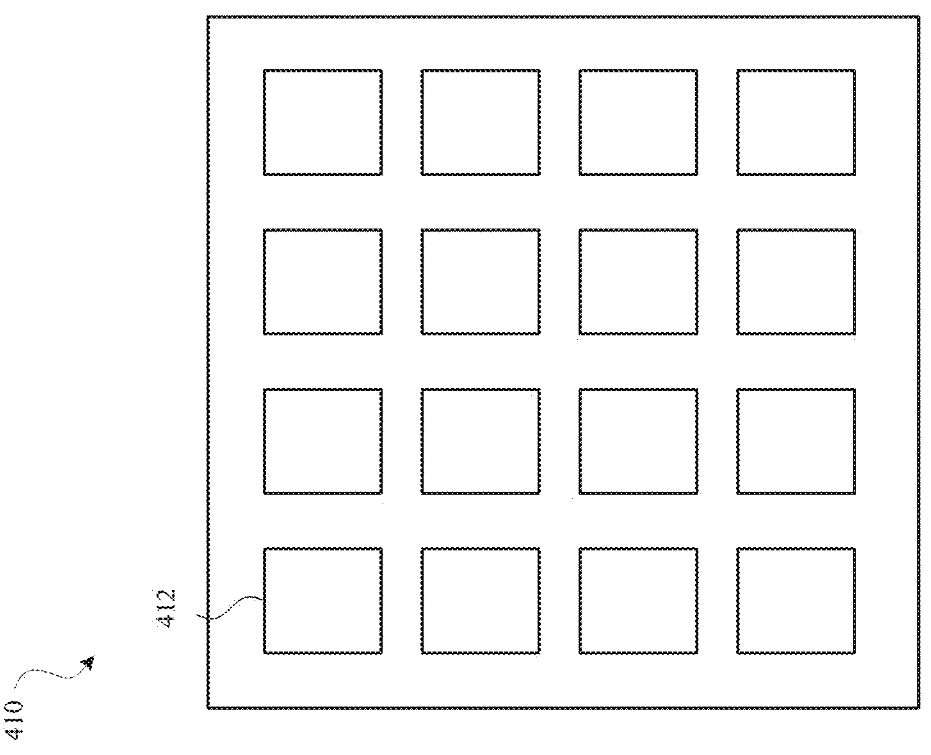
FIG. 4B illustrates a touch screen or touch sensor panel with touch node electrodes arranged in a pixelated touch node electrode configuration according to examples of the disclosure.
Figure 4A:
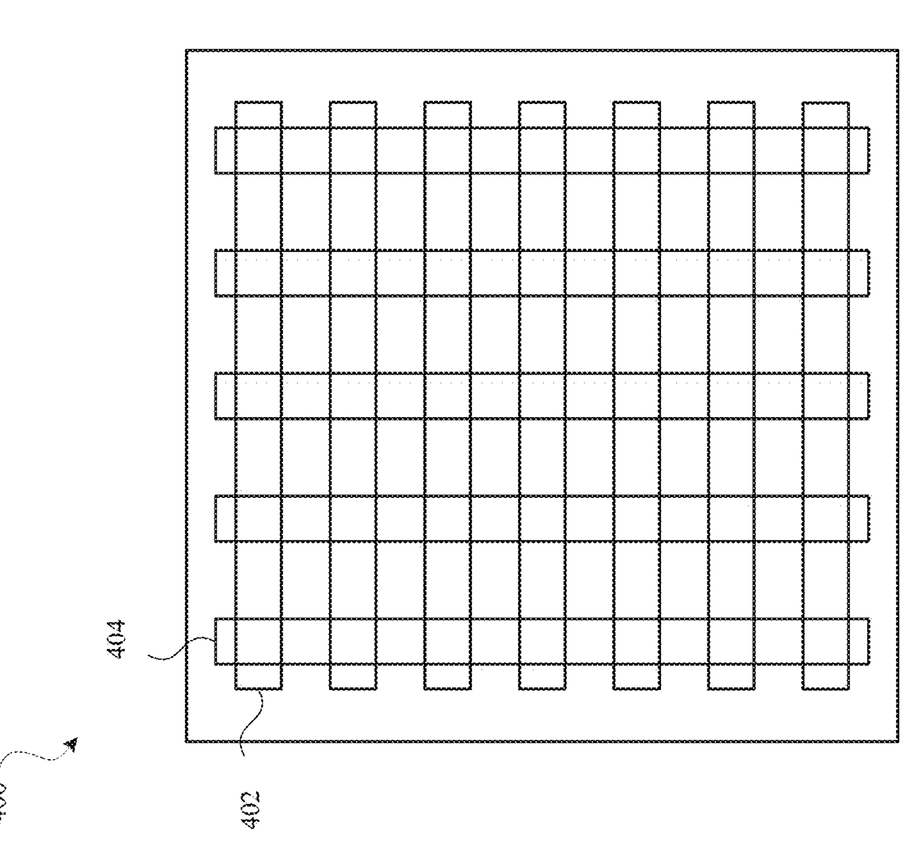
FIG. 4A illustrates a touch screen or touch sensor panel with touch electrodes arranged in rows and columns according to examples of the disclosure.

FIG. 4A illustrates a touch screen or touch sensor panel 400 with touch electrodes 402 and 404 arranged in rows and columns according to examples of the disclosure. Specifically, touch screen/panel 400 can include a plurality of touch electrodes 402 disposed as rows, and a plurality of touch electrodes 404 disposed as columns. Touch electrodes 402 and touch electrodes 404 can be on the same or different material layers on touch screen/panel 400, and can intersect with each other, as illustrated in FIG. 4A. In some instances, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some instances, touch screen/panel 400 can sense the self-capacitance of touch electrodes 402 and 404 to detect touch and/or proximity activity on touch screen/panel 400, and in some instances, touch screen/panel 400 can sense the mutual capacitance between touch electrodes 402 and 404 to detect touch and/or proximity activity on touch screen 400.

FIG. 4B illustrates a touch screen or touch sensor panel 410 with touch node electrodes 412 arranged in a pixelated touch node electrode configuration according to examples of the disclosure. Specifically, touch screen/panel 410 can include a plurality of individual touch node electrodes 412, each touch node electrode identifying or representing a unique location on the touch screen/panel at which touch or proximity (e.g., a touch or proximity event) is to be sensed, and each touch node electrode being electrically isolated from the other touch node electrodes in the touch screen/panel, as previously described. Touch node electrodes 412 can be on the same or different material layers on touch screen/panel 410. In some instances, touch screen/panel 410 can sense the self-capacitance of touch node electrodes 412 to detect touch and/or proximity activity on touch screen/panel 410, and, in some instances, touch screen/panel 410 can sense the mutual capacitance between touch node electrodes 412 to detect touch and/or proximity activity on touch screen/panel 410.

FIG. 5A illustrates an example touch sensor panel stack-up 500 according to examples of the disclosure. As shown, touch sensor panel stack-up 500 can include a printed circuit board (PCB) 502 on which sensing circuitry ("sensing circuitry" or "control circuitry") for the touch sensor panel can be implemented, pressure sensitive adhesive (PSA) 504, stiffener 506, PSA 508, substrate 510 on which the touch sensor panel electrodes can be implemented, PSA 512, bonding region 580, and glass ("glass" or "front crystal" or "interface") 514. Although PSAs are described, it should be understood that other adhesives may be used in the touch sensor panel stack-up. Additionally, although referred to as a glass, front crystal, or interface, it should be understood that the glass 514 represents any suitable outer surface that can be formed of any other suitable type of material(s) other than glass, crystal, and/or the like (e.g., plastic). Substrate 510 can include any suitable substrate formed of any suitable material or combination of materials. For example, substrate 510 can include a flexible plastic substrate such as a polyethylene terephthalate (PET) substrate, though other substrates can be used. In some instances, the touch electrodes can be formed on substrate 510 using a single-sided row-column sensor process with copper touch electrodes 516. It should be noted that the single-sided sensor process is thinner than a double side sensor process, and can be implemented to reduce a stack-up height of touch sensor panel stack-up 500.

A single bond site can be used for connection between the touch sensor electrodes/routing on the substrate 510 and the PCB 502 using an anisotropic conductive film (ACF) bond (e.g., for simpler manufacturing/integration). For example, the touch sensor electrodes/routing on the substrate 510 and the PCB 502 can be connected by bonding the PCB 502 to bond pads at the bonding region 580 using an ACF bond, and/or the like. The stiffener can be formed of a material (e.g., such as a metal or alloy) to provide structural strength and stability to touch sensor panel stack-up 500.

Figure 5:
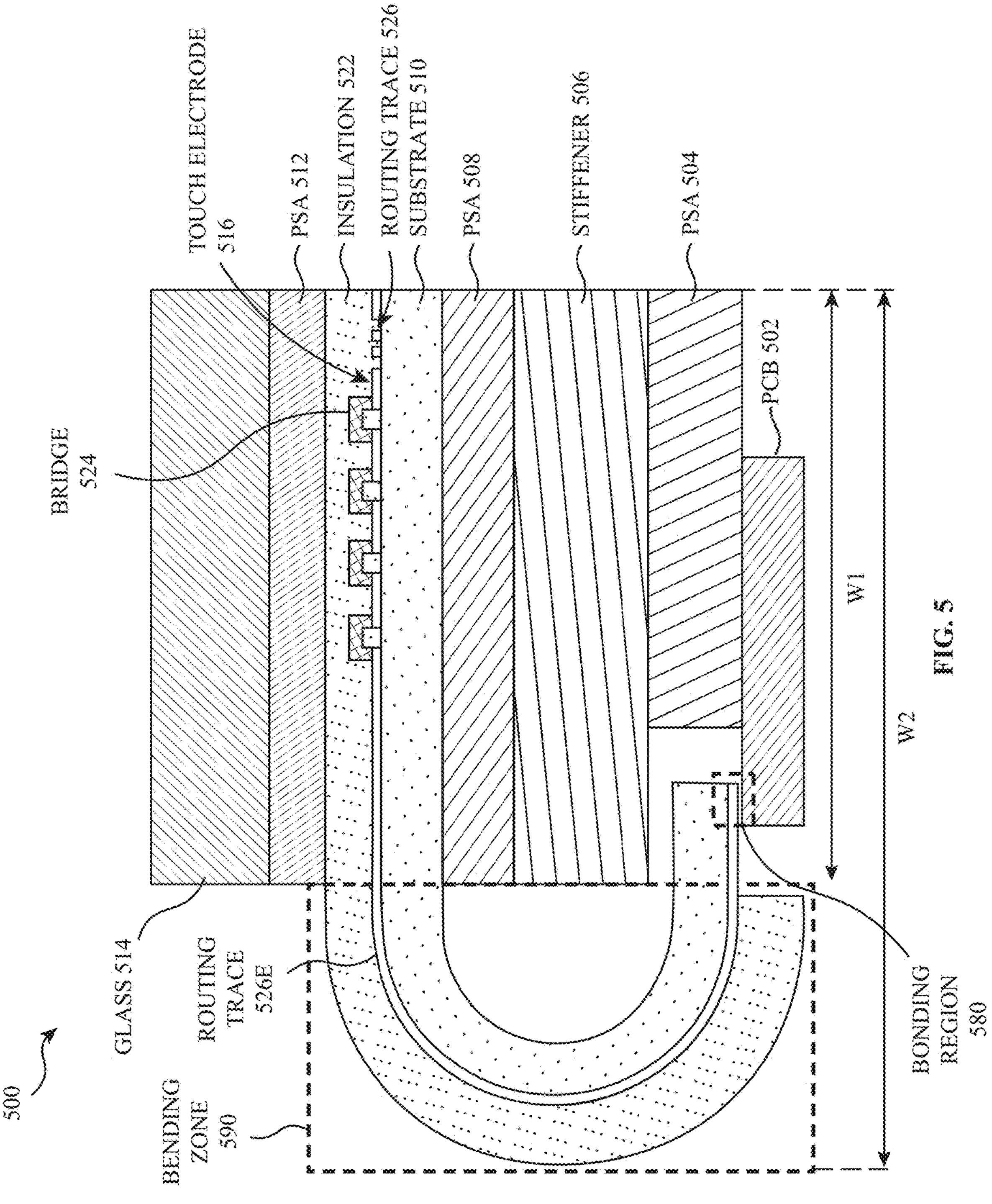
FIG. 5 illustrates an example touch sensor panel stack-up according to examples of the disclosure.

In some instances, copper touch electrodes 516 and copper routing traces 526 can be formed by a copper etching process that enables thinner copper routing traces for a thinner border. For example, the illustration of FIG. 5 shows a copper touch electrode segment for one copper touch electrode 516 for one axis of a two-axis touch sensor panel (e.g., a row touch electrode). FIG. 5 also illustrates routing trace 526 in a border region of touch sensor panel stack-up 500 and routing trace 526E from the active area of the touch sensor panel to the sensing circuitry. It should be understood that the touch sensor panel can include additional touch electrodes and routing traces that are not shown in FIG. 5 for simplicity of illustration. For example, as illustrated in FIG. 5, touch sensor panel stack-up 500 can include additional routing traces (not shown) and each of the routing traces can be routed to sensing circuitry (not shown) mounted to the PCB 502 using routing in the bending zone 590 of touch sensor panel stack-up 500. Additionally, in some examples, touch sensor panel stack-up 500 can include additional touch electrodes along a first axis (e.g., additional row touch electrodes), as well as touch electrodes along a second axis (e.g., column touch electrodes) implemented in the same layer as the touch electrodes along the first axis, but projecting from the plane of the sheet of drawings and running beneath silver bridge 524 (e.g., as shown in FIG. 5). Moreover, the touch electrodes can be insulated from one another using insulation (not shown).

Shown and described in greater detail hereinafter, in some instances, touch sensor panel stack-up 500 can further include bridges such as silver bridges 524 for connecting segments of touch electrodes such as copper touch electrodes 516 to form some of the touch electrodes located in an active area of a touch sensor panel (e.g., of touch sensor panel stack-up 500). For example, touch electrode segments such as of the copper touch electrode segments of copper touch electrode 516 can be connected by bridges such as silver bridge 524. Note that bridge 524 and other materials and layers in FIG. 5 (and all drawings herein) are not necessarily illustrated to scale, but may be shown with an exaggerated scale relative to other components of the stack-up for purposes of clarity of illustration.

In some instances, touch sensor panel stack-up 500 can also include a grounding shield such as a silver grounding shield 518 (not shown) over routing traces such as routing trace 526 at the border. Moreover, although not shown in FIG. 5, the grounding shield can be coupled by a via to a copper ground electrode (e.g., routing trace) in the copper layer. It should be understood that although the silver grounding shield is described as being silver, other conductive materials can be used for shielding (e.g., instead of or in addition to silver). In some instances, the silver grounding shield can be isolated from the routing traces (e.g., routing traces 526) by an insulation layer such as insulation layer 522, shown in FIG. 5. For example, the silver grounding shield can be implemented to effectively shield the routing traces (e.g., routing traces 526) from a user's fingers touching or in proximity to in the border region to reduce cross-coupling. The reduction in cross-coupling can improve touch sensing performance of touch sensor panel stack-up 500 and thereby improve user experience. Although the shield is described above as being located over the routing traces along one edge of the border, it should be understood that the shield can extend over various locations of the touch sensor panel. For example, in some arrangements the shield can extend over partial sides of the border region of the touch sensor panel stack-up (e.g., touch sensor panel stack-up 500), a subset of sides of the border region of the touch sensor panel, and/or all four sides of the border of the touch sensor panel. In some instances, substrate 510 can be between 20-40 um thick. In some instances, substrate 510 can include a material such as a flexible material (e.g., PET) to enable flexing of the substrate (e.g., in bending zone 590).

Figure 6A:
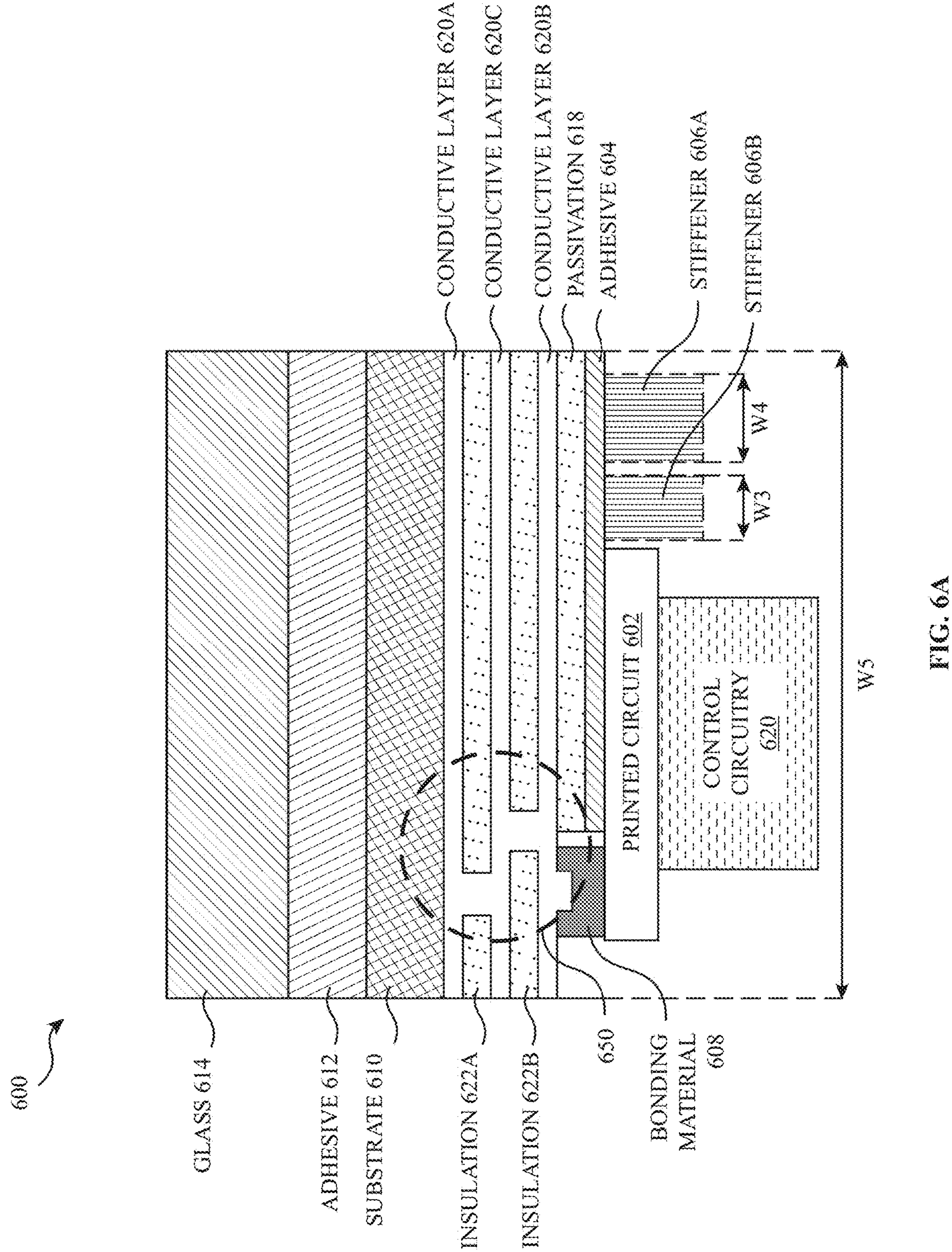
FIG. 6A illustrates an example touch sensor panel stack-up according to examples of the disclosure.
Figure 6B:
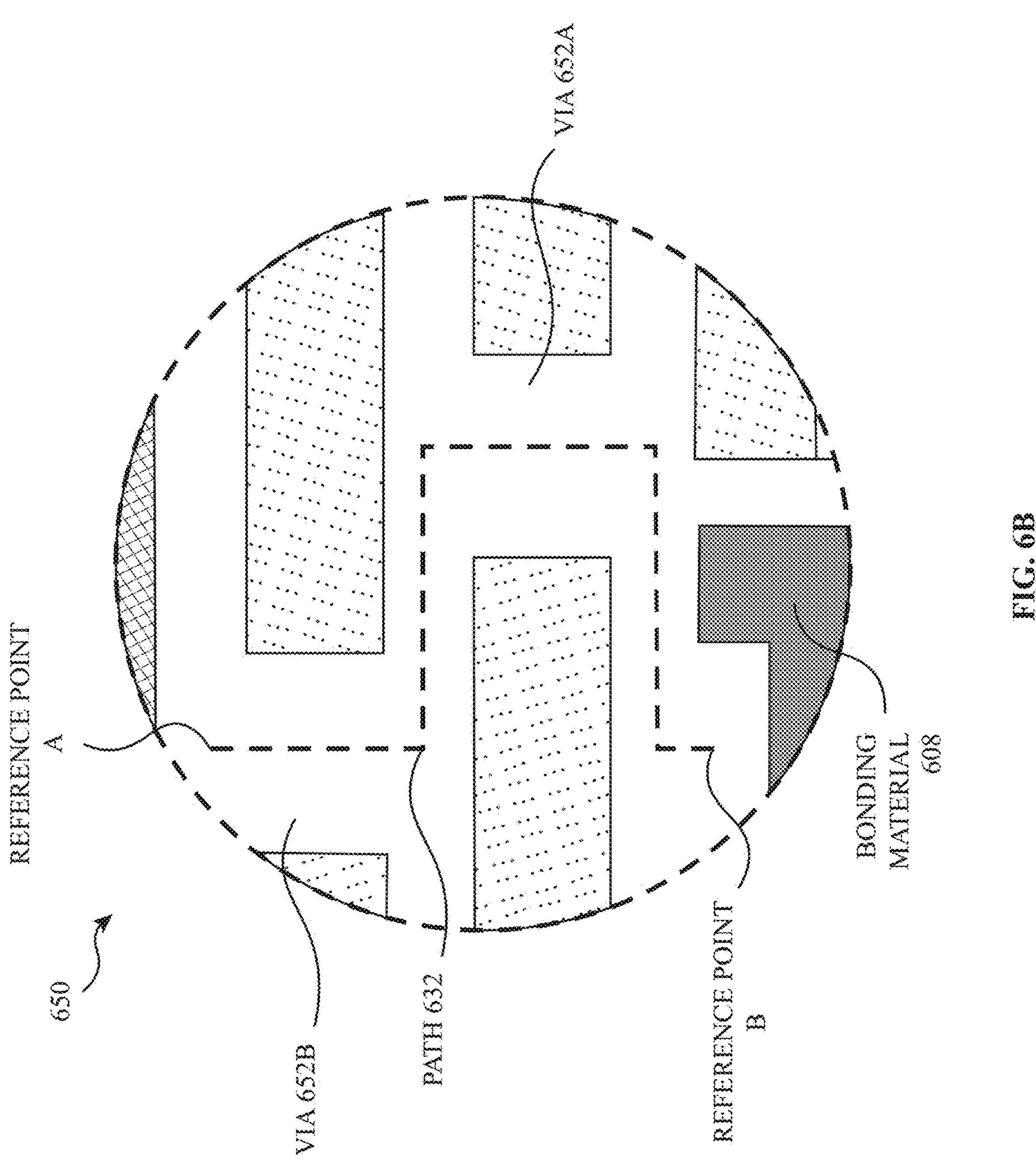
FIG. 6B illustrates an enlarged view showing additional detail of the touch sensor panel stack-up illustrated in FIG. 6A regarding an electrically conductive path, according to examples of the disclosure.
Figure 6C:
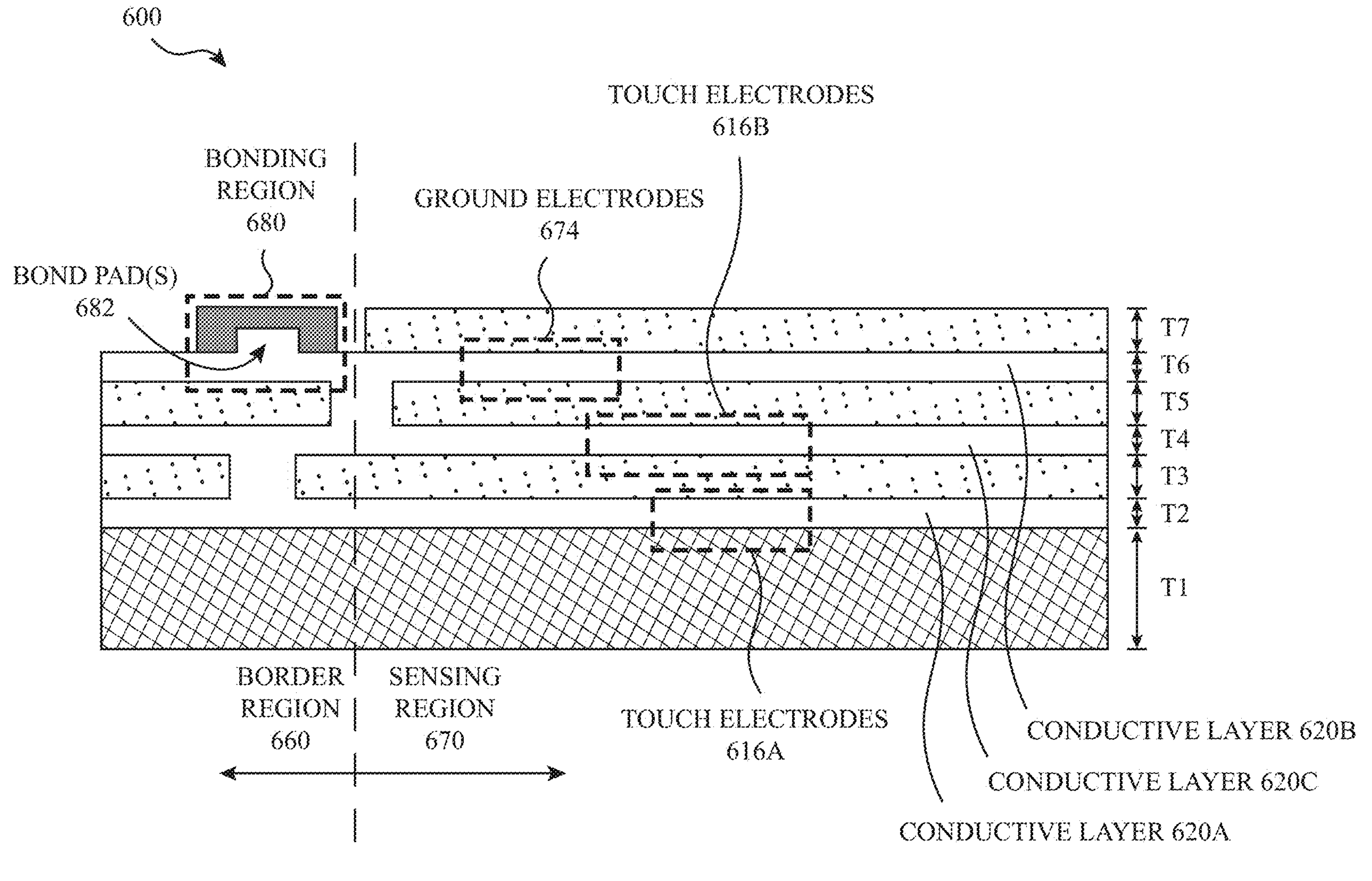
FIG. 6C illustrates yet another enlarged view showing additional detail of the touch sensor panel stack-up illustrated in FIG. 6A regarding a border region and a sensing region, according to examples of the disclosure.

FIG. 6A illustrates an example touch sensor panel stack-up 600 according to examples of the disclosure. FIG. 6B illustrates an enlarged view 650 showing additional detail of touch sensor panel stack-up 600 regarding electrically conductive path ("path" or "conductive path" or "electrically conductive path") 632, which can include via 652A and/or via 652B, according to examples of the disclosure. FIG. 6C illustrates yet another enlarged view showing additional detail of touch sensor panel stack-up 600 regarding border region 660 and sensing region 670. The touch sensor panel stack-up shown in FIG. 6C is shown upside down compared with the illustrations of touch sensor panel stack-up 600 shown in FIG. 6A and the enlarged view 650 shown in FIG. 6B.

As shown in FIG. 6A, touch sensor panel stack-up 600 can include a printed circuit such as printed circuit 602 on which control circuitry 620 such as sensing circuitry for the touch sensor panel can be implemented, adhesive ("adhesive" or "PSA") 604, a passivation layer 618, a substrate 610 on which the sensor electrodes (e.g., touch electrode 616A and/or touch electrode 616B of FIG. 6C) can be implemented, adhesive 612, bonding material 608 (e.g., including a bonding region 680 of FIG. 6C), glass 614, and, optionally, one or more stiffeners such as stiffener 606A and/or stiffener 606B. Similar to the PSAs (e.g., PSA 504, PSA 508, etc.), glass (e.g., glass 514), and/or substrate (e.g., substrate 510) discussed above with reference to FIG. 5, it should be understood that any suitable adhesive (e.g., for PSA 604, PSA 612), glass (e.g., for 614), and/or substrate (e.g., for substrate 610) can be used in touch sensor panel stack-up 600 according to examples of the disclosure, such as discussed above with reference to FIG. 5.

In some instances, substrate 610 can include, for example, a PET substrate, and/or the like. Substrate 610 can otherwise include any other suitable type of substrate in accordance with examples of the disclosure. Printed circuit 602 can be separated from substrate 610 by at least a plurality of conductive layers (e.g., conductive layer 620A and conductive layer 620B; or conductive layer 620A, conductive layer 620B, and conductive layer 620C). Printed circuit 602 can be bonded to a plurality of bond pads (e.g., bond pad(s) 682 of FIG. 6C) by a conductive bonding material 608. For example, bonding material 608 can be disposed between conductive layer 620B and printed circuit 602 such as shown in FIG. 6A. In some instances, bonding material 608 can include, for example, an ACF, an anisotropic conductive adhesive (ACA), an anisotropic conductive paste (ACP), and/or the like. In some instances, passivation 618 and/or adhesive 604 can be disposed at least partially between printed circuit 602 and conductive layer 620B, as shown in FIG. 6A.

Control circuitry 620 can be mounted to printed circuit 602 for integration within touch panel stack-up 600. Control circuitry 620 can include, for example, sensing circuitry and/or control circuitry such as touch sensing circuitry, touch control circuitry, and/or the like. Control circuitry 620 can otherwise include any suitable type or form of circuitry for implementation in conjunction with touch sensor panel stack-up 600, according to examples of the disclosure. In some instances, printed circuit 602 can be bonded to bonding region 680 (see FIG. 6C) on or at a first side thereof, as shown in FIG. 6A. In some instances, control circuitry 620 can be mounted to printed circuit 602 to or at a second side of printed circuit 602 (opposite the first side of the printed circuit 602), as shown in FIG. 6A.

Touch sensor panel stack-up 600 can include a plurality of conductive layers, as shown in FIGS. 6A and 6C. For example, touch sensor panel stack-up 600 can include a plurality of conductive layers such as a first conductive layer (e.g., conductive layer 620A) and a second conductive layer (e.g., conductive layer 620B), as shown in FIGS. 6A and 6C. In some instances, conductive layer 620B can be separated from substrate 610 by conductive layer 620A. In some instances, the plurality of conductive layers can further include, for example, a third conductive layer (e.g., conductive layer 620C) between the first conductive layer and the second conductive layer, as shown in FIGS. 6A and 6C. In some instances, the plurality of conductive layers can include, for example, one or more silver nanowire electrodes formed in the first conductive layer (e.g., conductive layer 620A). In some instances, the plurality of conductive layers can include, for example, one or more carbon electrodes formed in the second conductive layer (e.g., conductive layer 620B). The plurality of conductive layers can otherwise include or be formed of any other suitable material, in accordance with examples of the disclosure. In some instances, touch sensor panel stack-up 600 can include a passivation layer and an adhesive layer between the printed circuit and the second conductive layer. For example, touch sensor panel stack-up 600 can include passivation layer 618 and adhesive 604 between printed circuit 602 and conductive layer 620B, as shown in FIG. 6A.

In some instances, touch sensor panel stack-up 600 can include a plurality of insulating layers including a first insulating layer such as insulation 622A and/or a second insulating layer such as insulation 622B. For example, insulation 622A can be disposed between conductive layer 620A and conductive layer 620B and insulation 622B can be disposed between conductive layer 620B and printed circuit 602, as shown in FIG. 6A.

In some instances, touch sensor panel stack-up 600 can include one or more stiffeners such as stiffener 606A and/or stiffener 606B. Stiffener 606A and/or stiffener 606B can be disposed at least partially in the same layer as printed circuit 602, as shown in FIG. 6A. In some instances, touch sensor panel stack-up 600 can include an active touch sensing area defined, at least in part, by the dimensions of touch electrodes 616A and/or touch electrodes 616B shown in FIG. 6C. The touch sensing area can be defined by the product of the width W5 and the length (not shown) of touch sensor panel stack-up 600. Touch sensor panel stack-up 600 further includes a stiffening area defined, at least in part, by the dimensions of stiffener 606A and/or stiffener 606B. The stiffening area can be defined by the sum of the stiffening areas of stiffener 606A and stiffener 606B, as shown in FIG. 6A. For example, stiffener 606A and/or stiffener 606B can include a stiffening area defined by the sum of (i) the product of the width W3 and length of stiffener 606A and (ii) the product of the width W4 and length of stiffener 606B. The stiffening area (e.g., having a second surface area) can be less than the active touch sensing area (e.g., having a first surface area). That is, touch electrodes 616A and/or touch electrodes 616B (as shown in FIG. 6C) can define an active touch sensing area having a first surface area, and the one or more stiffeners define a stiffening area having a second surface area less than the first surface area.

As shown in FIG. 6B, touch sensor panel stack-up 600 can include a path ("electrically conductive path" or "path" or "routing") such as path 632 from a first conductive layer (e.g., conductive layer 620A of FIG. 6A) to a second conductive layer (e.g., conductive layer 620B of FIG. 6A). As shown in FIG. 6C, bonding region 680 can include a plurality of bond pad(s) 682 for interconnection with a plurality of electrodes (e.g., touch electrodes 616A, touch electrodes 616B, etc.). In some instances, touch electrodes 616A and/or touch electrodes 616B can be interconnected with control circuitry 620 (see FIG. 6A) through bond pad(s) 682 and path 632 as shown in FIG. 6B. Referring again to FIG. 6B, path 632 can include a plurality of vias from the first conductive layer to the second conductive layer, including a plurality of vias (e.g., via 652B) from the first conductive layer 620A (see FIG. 6A) to the third conductive layer 620B (see FIG. 6A) and a plurality of vias (e.g., via 652A) from the third conductive layer to the second conductive layer 620C (see FIG. 6A).

While path 632 is shown as including two discrete sets of vias (e.g., via 652A, via 652B) such as shown in FIG. 6B, other arrangements are contemplated. For example, in some instances, path 632 can include more than two discrete sets of vias. As another example, in some instances, via 652B and via 652A may not be offset such as shown in FIG. 6B. That is, in some instances, path 632 can include a substantially linear, coaxially aligned via (not shown) extending from conductive layer 620A to conductive layer 620B and/or from conductive layer 620A to conductive layer 620C to conductive layer 620B (see FIG. 6A). For example, in some instances, path 632 can form or otherwise include a substantially linear, coaxially aligned via that extends straight down from Reference Point A to Reference Point B as shown in FIG. 6B. Path 632 can otherwise include a plurality of vias having any other arrangement, shape, form, and/or quantity for interconnecting a plurality of bond pads (e.g., bond pad(s) 682 of FIG. 6C, etc.) and a plurality of electrodes (e.g., touch electrodes 616A, touch electrodes 616B of FIG. 6C, etc.) according to the examples of the disclosure.

As shown in FIG. 6C, touch sensor panel stack-up 600 can include, for example, a border region 660 and a sensing region 670. Border region 660 can include a bonding region 680 and bond pad(s) 682. Conductive layer 620A can optionally include a plurality of touch electrodes (e.g., touch electrodes 616A), conductive layer 620C can optionally include a plurality of touch electrodes (e.g., touch electrodes 616B), and conductive layer 620B can include a grounding region ("ground layer" or "grounding region") with a plurality of ground electrodes (e.g., ground electrodes 674).

Bonding region can include routing (e.g., such as path 632 including via 652A and/or via 652B as shown in FIG. 6B) between the plurality of touch electrodes to sensing circuitry (e.g., at printed circuit 602 in FIG. 6A) without the use of a flexible circuit or other routing means (e.g., described with reference to FIG. 5) that may add to the stack-up height or increase space requirements. For example, the routing can be implemented via a plurality of vias such as shown in FIGS. 6B-6C. In some instances, touch sensor panel stack-up 600 can include, for example, a 2-layer stack-up or a 3-layer sensor stack-up. For example, with reference to FIG. 6C, in the 2-layer stack-up, touch sensor panel stack-up 600 can include a plurality of touch electrodes 616A which can be formed in a top conductive layer (e.g., conductive layer 620A) and a grounding region with a plurality of ground electrodes 674 which can be formed in a bottom conductive layer (e.g., conductive layer 620B). Moreover, a bonding region 680 with a plurality of bond pads 682 can be formed in the bottom conductive layer. The bottom conductive layer (e.g., conductive layer 620B) represents an internally integrated ground layer and/or grounding region of touch sensor panel stack-up 600, as discussed in further detail herein.

As another example, in the 3-layer stack-up, touch sensor panel stack-up 600 can include a first plurality of touch electrodes 616A formed in a top conductive layer (e.g., conductive layer 620A), a second plurality of touch electrodes 616B formed in a middle conductive layer (e.g., conductive layer 620C), and a grounding region with a plurality of ground electrodes 674 formed in a bottom conductive layer (e.g., conductive layer 620B). Moreover, touch sensor panel stack-up 600 can include a bonding region 680 with a plurality of bond pads 682 formed in the bottom conductive layer. In some instances, in the 3-layer stack-up, touch electrodes 616A can be formed in conductive layer 620A, touch electrodes 616B can be formed in conductive layer 620C, and ground electrodes 674 and bond pad(s) 682 can be formed in conductive layer 620B.

Touch sensor panel stack-up 600 can include overall width W5 as shown in FIG. 6A. In some instances, touch sensor panel stack-up 600 can include, for example, an internal ground layer and/or grounding region formed in a bottom conductive layer such as conductive layer 620B. The internal ground layer and/or grounding region can include a plurality of ground electrodes 674 (see FIG. 6C). Advantageously, due at least in part to the internal ground layer and/or grounding region, touch sensor panel stack-up 600 can have an overall width W5 that is less than an overall width W1 of touch sensor panel stack-up 500, as discussed above with reference to FIG. 5. Moreover, the overall width W5 can also be less than the width W2 of touch sensor panel stack-up 500 including the width of bending zone 590 as shown in FIG. 5.

As shown in FIG. 6C, touch sensor panel stack-up 600 can include a stack-up thickness. For example, the stack-up thickness can include thickness T1, thickness T2, thickness T3, thickness T4, thickness T5, thickness T6, and/or thickness T7. In some instances, thickness T1 (e.g., thickness of substrate 610) can be approximately 25 μm±3 μm, thickness T2 (e.g., thickness of conductive layer 620A) can be approximately 10 μm±5 μm, thickness T3 (e.g., thickness of insulation 622A) can be approximately 40 μm±12 μm, thickness T4 (e.g., thickness of conductive layer 620C) can be approximately 10 μm±5 μm, thickness T5 (e.g., thickness of insulation 622B) can be approximately 40 μm±12 μm, thickness T6 (e.g., thickness of conductive layer 620B) can be approximately 10 μm±5 μm, and/or thickness T7 (e.g., thickness of passivation 618) can be approximately 20 μm±10 μm. In some instances, the stack-up thickness can be substantially equal to the sum of thicknesses T1-T7. In some instances, the sum of thicknesses T1-T7 can be between 140 and 155 microns or less. For example, in some instances, the sum of thicknesses T1-T7 can be less than 155 microns. As another example, in some instances, the sum of thicknesses T1-T7 can be less than 140 microns. In some instances, the sum of thicknesses T1-T7 can substantially correspond to a combined thickness of the substrate (e.g., substrate 610), the plurality of conductive layers (e.g., conductive layer 620A, conductive layer 620B, conductive layer 620C), and the plurality of insulating layers (e.g., insulation 622A, insulation 622B). For example, in some instances, the combined thickness of the substrate, the plurality of conductive layers and the plurality of insulating layers can be between 140 and 155 microns or less.

It should be understood that a thickness of bonding region 680, including bond pad(s) 682, need not be similar to a thickness T7 of passivation 618, although it is illustrated as such in FIG. 6C for case of description. For example, in some instances, bonding region 680 including bond pad(s) 682 may be contained in or at a layer substantially coinciding with conductive layer 620B of thickness T6, as shown in FIG. 6C. As another example, in some instances, bonding region 680 including bond pad(s) 682 may be contained in or at the layer of passivation 618 and/or adhesive 604 as shown in FIG. 6A.

Figure 7A:
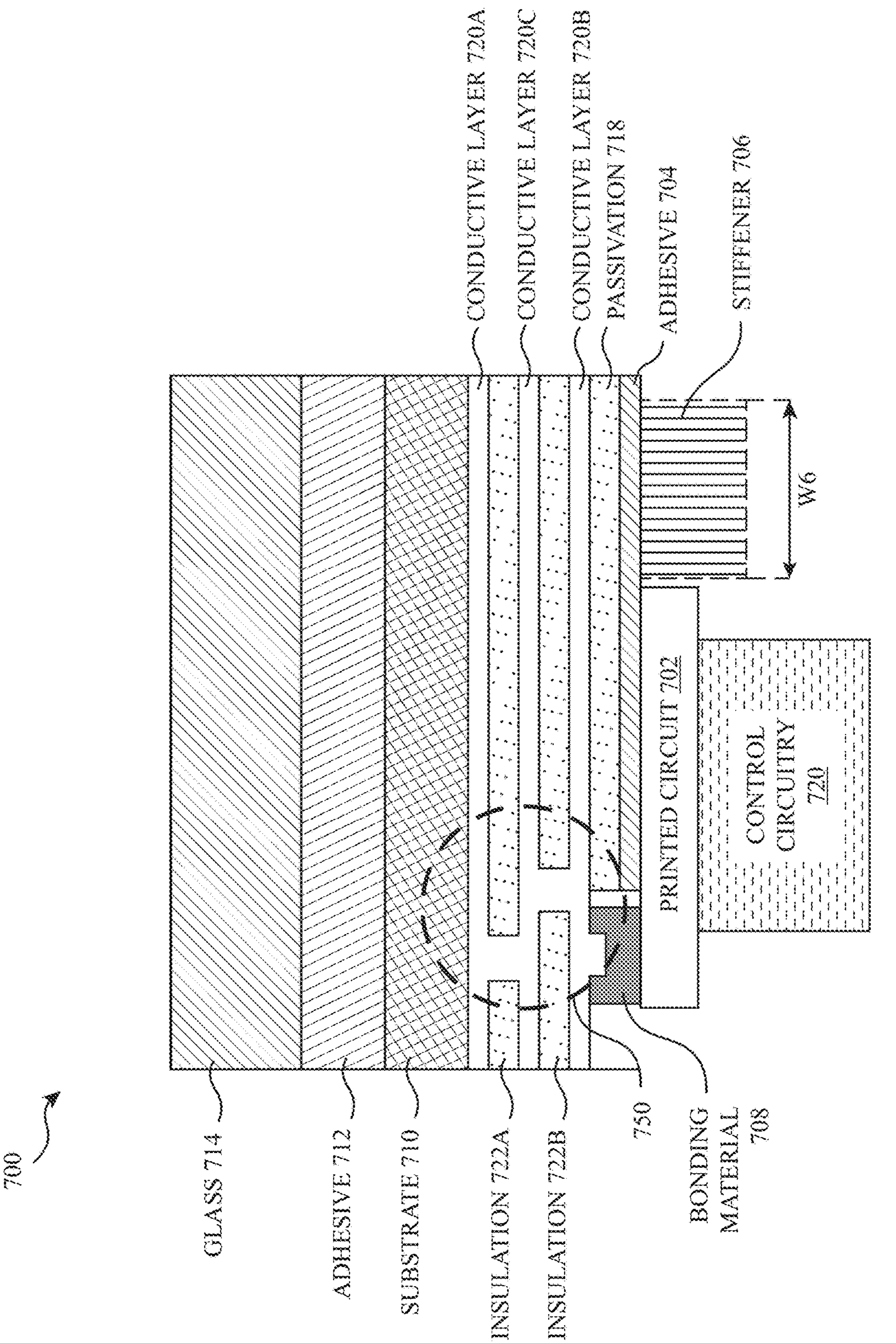
FIG. 7A illustrates an example touch sensor panel stack-up according to examples of the disclosure.
Figure 7B:
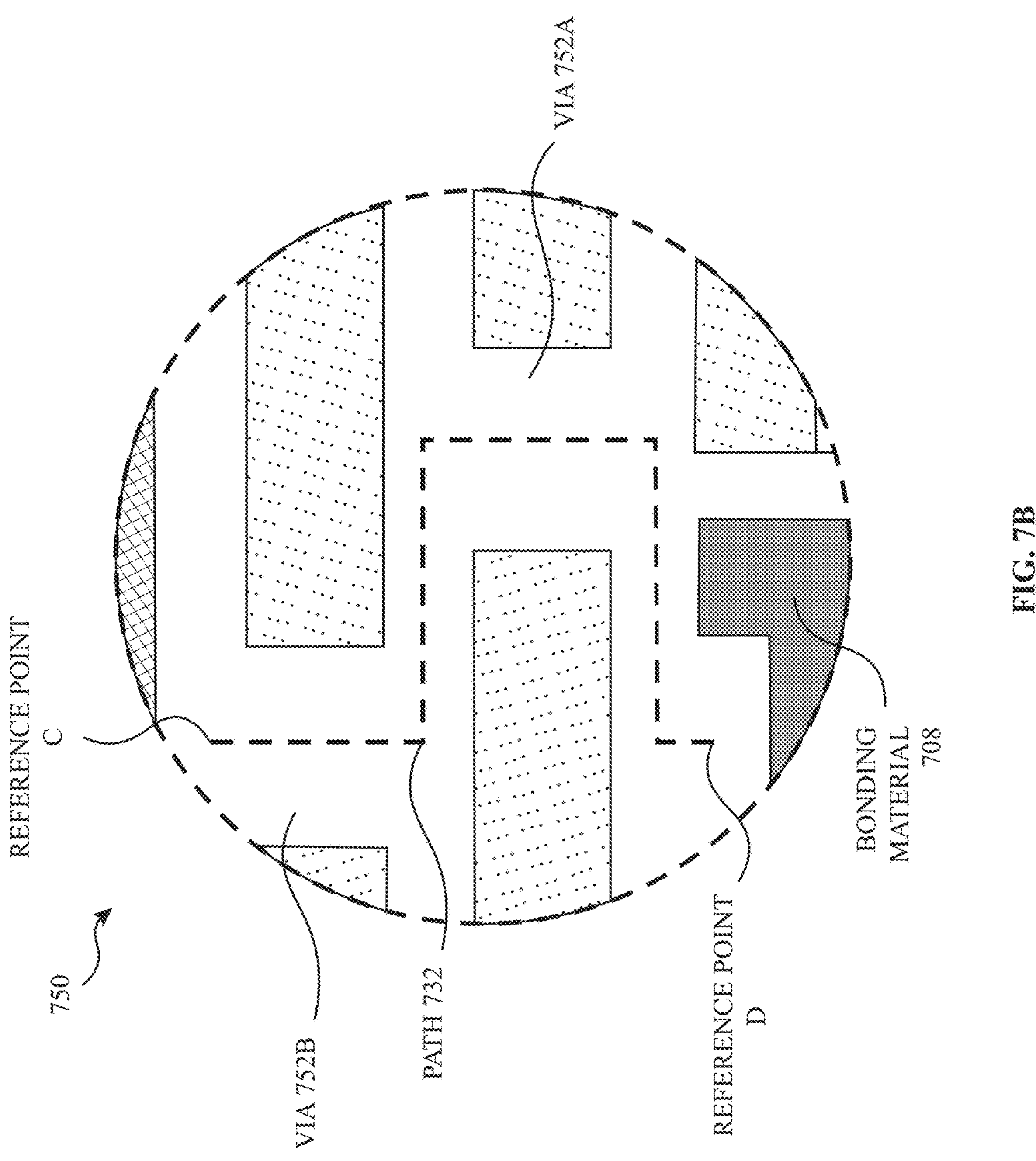
FIG. 7B illustrates an enlarged view showing additional detail of the touch sensor panel stack-up illustrated in FIG. 7A regarding an electrically conductive path, according to examples of the disclosure.
Figure 7C:
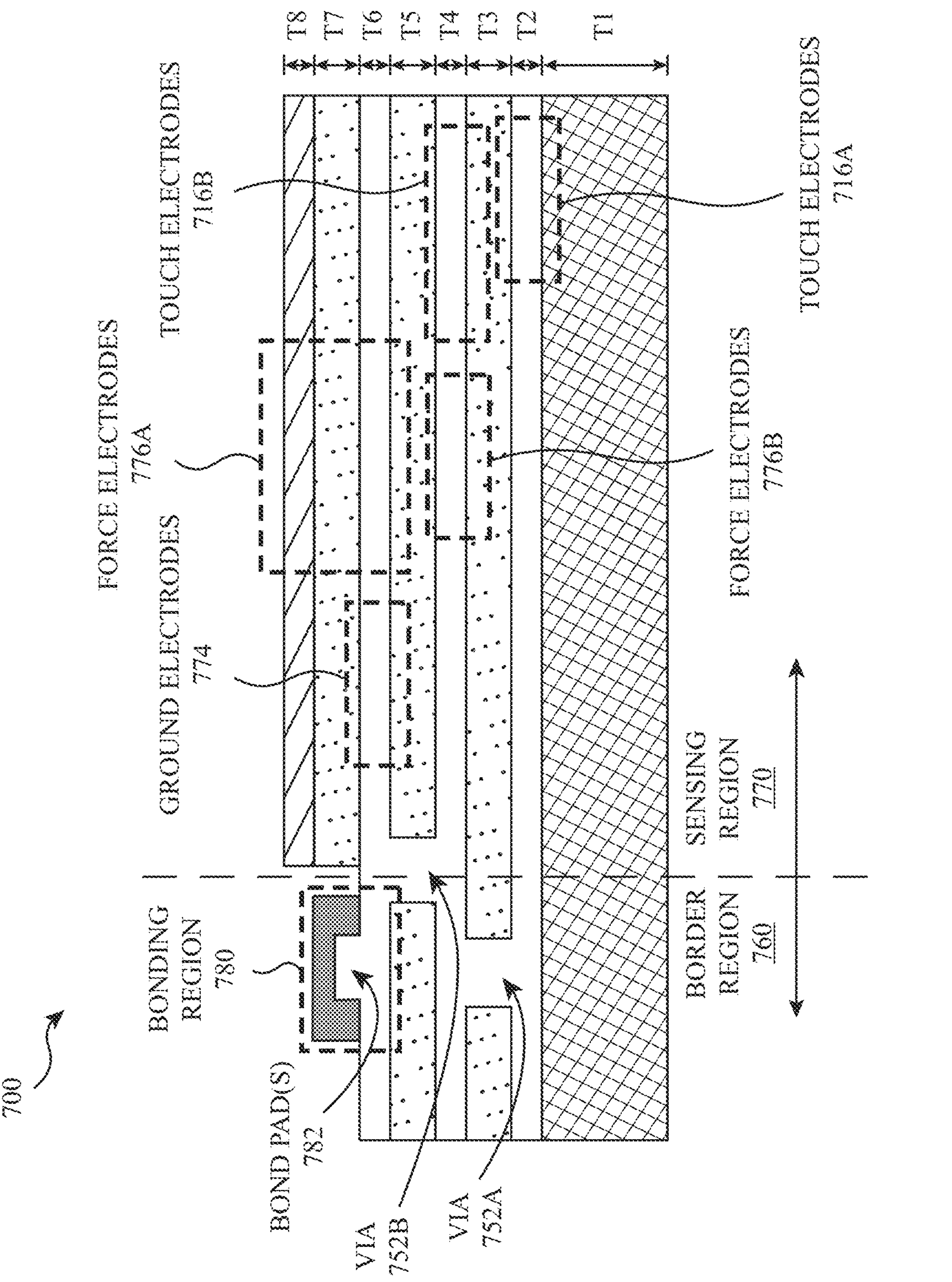
FIG. 7C illustrates yet another enlarged view showing additional detail of the touch sensor panel stack-up illustrated in FIG. 7A regarding the border region and the sensing region, according to examples of the disclosure.

FIG. 7A illustrates an example touch sensor panel stack-up 700 according to examples of the disclosure. FIG. 7B illustrates an enlarged view 750 showing additional detail of touch sensor panel stack-up 700 regarding electrically conductive path 732, which can include via 752A and/or via 752B, according to examples of the disclosure. FIG. 7C illustrates yet another enlarged view showing additional detail of touch sensor panel stack-up 700 regarding border region 760 and sensing region 770. The touch sensor panel stack-up shown in FIG. 7C is shown upside down compared with the illustrations of touch sensor panel stack-up 700 shown in FIG. 7A and the enlarged view 755 shown in FIG. 7B.

As shown in FIG. 7A, touch sensor panel stack-up 700 can include a printed circuit such as printed circuit 702 on which control circuitry 720 such as sensing circuitry for the touch sensor panel can be implemented, adhesive 704, a passivation layer 718, a substrate 710 on which the sensor electrodes (e.g., touch electrode 716A, touch electrode 716B, and force electrode(s) 776A-B of FIG. 7C) can be implemented, adhesive 712, bonding material 708 (e.g., including a bonding region 780 of FIG. 7C), glass 714, and, optionally, one or more stiffeners such as stiffener 706. Similar to the PSAs (e.g., PSA 504, PSA 508, PSA 604, PSA 612, etc.), glass (e.g., glass 514, glass 614), and/or substrate (e.g., substrate 510, substrate 610), such as discussed above with reference to FIGS. 5 and 6A-6C, it should be understood that any suitable adhesive (e.g., PSA 704, PSA 712), glass (e.g., glass 714), and/or substrate (e.g., for substrate 710) can be used in touch sensor panel stack-up 700 according to examples of the disclosure, such as discussed above with reference to FIGS. 5-6.

In some instances, substrate 710 can include, for example, a PET substrate, and/or the like. Substrate 710 can otherwise include any other suitable type of substrate in accordance with examples of the disclosure. Printed circuit 702 can be separated from substrate 710 by at least a plurality of conductive layers (e.g., conductive layer 720A and conductive layer 720B; or conductive layer 720A, conductive layer 720B, and conductive layer 720C). Printed circuit 702 can be bonded to a plurality of bond pads (e.g., bond pad(s) 782 of FIG. 7C) by a conductive bonding material 708. For example, bonding material 708 can be disposed between conductive layer 720B and printed circuit 702 such as shown in FIG. 7A. In some instances, bonding material 708 can include, for example, an ACF, an ACA, an ACP, and/or the like. In some instances, passivation 718 and/or adhesive 704 can be disposed at least partially between printed circuit 702 and conductive layer 720B, as shown in FIG. 7A.

Control circuitry 720 can be mounted to printed circuit 702 for integration within touch sensor panel stack-up 700. Control circuitry 720 can include, for example, sensing circuitry and/or control circuitry such as touch sensing circuitry, touch control circuitry, force sensing circuitry, pressure control circuitry, strain sensing control circuitry, and/or the like. Control circuitry 720 can otherwise include any suitable type or form of circuitry for implementation in conjunction with touch sensor panel stack-up 700, according to examples of the disclosure. In some instances, printed circuit 702 can be bonded to bonding region 780 (see FIG. 7C) on or at a first side thereof, as shown in FIG. 7A. In some instances, control circuitry 720 can be mounted to printed circuit 702 to or at a second side of printed circuit 702 (opposite the first side of the printed circuit 702), as shown in FIG. 7A.

Touch sensor panel stack-up 700 can include a plurality of conductive layers, as shown in FIGS. 7A and 7C. For example, touch sensor panel stack-up 700 can include a plurality of conductive layers such as a first conductive layer (e.g., conductive layer 720A), a second conductive layer (e.g., conductive layer 720B), and a third conductive layer (e.g., conductive layer 720C), as shown in FIGS. 7A and 7C. In some instances, conductive layer 720B can be separated from substrate 710 by conductive layer 720A. In some instances, the third conductive layer can be disposed between the first conductive layer and the second conductive layer, as shown in FIGS. 7A and 7C. In some instances, the plurality of conductive layers can include, for example, one or more silver nanowire electrodes formed in the first conductive layer (e.g., conductive layer 720A). In some instances, the plurality of conductive layers can include, for example, one or more carbon electrodes formed in the second conductive layer (e.g., conductive layer 720B). The plurality of conductive layers can otherwise include or be formed of any other suitable material, in accordance with examples of the disclosure.

In some instances, touch sensor panel stack-up 700 can include a plurality of insulating layers including a first insulating layer such as insulation 722A and/or a second insulating layer such as insulation 722B. For example, insulation 722A can be disposed between conductive layer 720A and conductive layer 720B and insulation 722B can be disposed between conductive layer 720B and printed circuit 702, as shown in FIG. 7A.

In some instances, touch sensor panel stack-up 700 can include one or more stiffeners such as stiffener 706. Stiffener 706 can be disposed at least partially in the same layer as printed circuit 702, as shown in FIG. 7A. In some instances, touch sensor panel stack-up 700 can include an active touch sensing area defined, at least in part, by the dimensions of touch electrodes 616A and/or touch electrodes 616B shown in FIG. 7C. Touch sensor panel stack-up 700 can further include a stiffening area defined, at least in part, by the dimensions of stiffener 706. The stiffening area can be defined by the product of the width W6 and length of stiffener 706. The stiffening area (e.g., having a second surface area) can be less than the active touch sensing area (e.g., having a first surface area). That is, touch electrodes 716A and/or touch electrodes 716B (as shown in FIG. 7C) can define an active touch sensing area having a first surface area, and stiffener 706 define a stiffening area having a second surface area less than the first surface area.

As shown in FIG. 7B, touch sensor panel stack-up 700 can include a path such as path 732 from a first conductive layer (e.g., conductive layer 720A) to a second conductive layer (e.g., conductive layer 720B). As shown in FIG. 7C, bonding region 780 can include a plurality of bond pad(s) 782 for interconnection with a plurality of electrodes (e.g., touch electrodes 716A, touch electrodes 716B, force electrodes 776A, force electrodes 776B, etc.). In some instances, touch electrodes 716A can be interconnected with control circuitry 720 (see FIG. 7A) through bond pad(s) 782 and path 732 as shown in FIG. 7B. Referring again to FIG. 7B, path 732 can include a plurality of vias from the first conductive layer to the second conductive layer, including a plurality of vias (e.g., via 752B) from the first conductive layer 720A (see FIG. 7A) to the third conductive layer 720B (see FIG. 7A) and a plurality of vias (e.g., via 752A) from the third conductive layer to the second conductive layer 720C (see FIG. 7A).

While path 732 is shown as including two discrete sets of vias (e.g., via 752A, via 752B) such as shown in FIG. 7B, other arrangements are contemplated. For example, in some instances, path 732 can include more than two discrete sets of vias. As another example, in some instances, via 752B and via 752A may not be offset such as shown in FIG. 7B. For example, path 732 can include a substantially linear, coaxially aligned via (not shown) extending from conductive layer 720A to conductive layer 720B and/or from conductive layer 720A to conductive layer 720C to conductive layer 720B, such as discussed above with reference to path 632 and FIG. 6B. Path 732 can otherwise include a plurality of vias having any other arrangement, shape, form, and/or quantity for interconnecting a plurality of bond pads (e.g., bond pad(s) 782 of FIG. 7C, etc.) and a plurality of electrodes (e.g., touch electrodes 716A, touch electrodes 716B of FIG. 7C, etc.) according to the examples of the disclosure.

As shown in FIG. 7C, touch sensor panel stack-up 700 can include, for example, a border region 760 and a sensing region 770. As shown, border region 760 can include a bonding region 780, including bond pad(s) 782. Conductive layer 720A (having width T2) can optionally include a plurality of touch electrodes (e.g., touch electrodes 716A), conductive layer 720C (having width T4) can optionally include a plurality of touch electrodes (e.g., touch electrodes 716B) and a plurality of force electrodes (e.g., force electrodes 776B), and conductive layer 720B (having width T6) can optionally include a plurality of force electrodes (e.g., force electrodes 776A) and a grounding region with a plurality of ground electrodes (e.g., ground electrodes 774).

Bonding region can include routing (e.g., such as path 732 including via 752A and/or via 752B as shown in FIG. 7B) between the plurality of touch electrodes to sensing circuitry (e.g., at printed circuit 702 in FIG. 7A) without the use of a flexible circuit or other routing means (e.g., described with reference to FIG. 5) that may add to the stack-up height or increase space requirements. For example, the routing can be implemented via a plurality of vias such as shown in FIGS. 7B-7C. In some instances, the plurality of force electrodes (e.g., force electrodes 776A) can be formed in the same layer as the plurality of ground electrodes (e.g., ground electrodes 774) and/or the plurality of bond pad(s) (e.g., bond pad(s) 782) as shown in FIG. 7C. In some instances, the plurality of force electrodes (e.g., force electrodes 776B) can be formed in the third conductive layer (e.g., conductive layer 720C of FIG. 7A). In some instances, the plurality of force electrodes (e.g., force electrodes 776A) can be formed in the second conductive layer (e.g., conductive layer 720B of FIG. 7A). In some instances, the plurality of force electrodes (e.g., force electrodes 776B) can be formed in the passivation layer (e.g., passivation 718 of FIG. 7A).

In some instances, touch sensor panel stack-up 700 can include, for example, with reference to FIG. 7C, a 2-layer stack-up or a 3-layer sensor stack-up. For example, in the 2-layer stack-up, touch sensor panel stack-up 700 can include a plurality of touch electrodes 716A which can be formed in a top conductive layer (e.g., conductive layer 720A) and a grounding region with a plurality of ground electrodes 774 which can be formed in a bottom conductive layer (e.g., conductive layer 620B). Moreover, a bonding region 780 with a plurality of bond pads 782 can be formed in the bottom conductive layer. In some instances, a plurality of force electrodes (e.g., force electrodes 776A) can also be formed in the bottom conductive layer. The bottom conductive layer (e.g., conductive layer 720B) represents an internally integrated ground layer of touch sensor panel stack-up 700, as discussed in further detail herein.

As another example, in the 3-layer stack-up, touch sensor panel stack-up 700 can include a first plurality of touch electrodes 716A formed in a top conductive layer (e.g., conductive layer 720A), a second plurality of touch electrodes 716B formed in a middle conductive layer (e.g., conductive layer 720C), and a grounding region with a plurality of ground electrodes 774 formed in a bottom conductive layer (e.g., conductive layer 720B). Moreover, touch sensor panel stack-up 700 can include a bonding region 780 with a plurality of bond pads 782 formed in the bottom conductive layer. In some instances, in the 3-layer stack-up, touch electrodes 716A can be formed in conductive layer 720A, touch electrodes 716B can be formed in conductive layer 720C, and force electrodes 776B, ground electrodes 774, and bond pad(s) 782 can be formed in conductive layer 720B.

As shown in FIG. 7C, touch sensor panel stack-up 700 can include a stack-up thickness. For example, the stack-up thickness can include thickness T1, thickness T2, thickness T3, thickness T4, thickness T5, thickness T6, and/or thickness T7 (e.g., as discussed above with reference to FIG. 6C). In some instances, thickness T8 (e.g., thickness of substrate 710) can be approximately 20 μm±10 μm. For example, in some instances, the stack-up thickness can be substantially equal to the sum of thicknesses T1-T7. In some instances, the sum of thicknesses T1-T7 can be between 140 and 155 microns or less. For example, a combined thickness of the substrate (e.g., substrate 710), the plurality of conductive layers (e.g., conductive layer 720A, conductive layer 720B, conductive layer 720C), and the plurality of insulating layers (e.g., insulation 722A, insulation 722B) can be between 140 and 155 microns or less. As another example, in some instances, the sum of thicknesses T1-T7 can be less than 140 microns. As another example, in some instances, the sum of thicknesses T1-T7 can be less than 155 microns.

Figure 8:
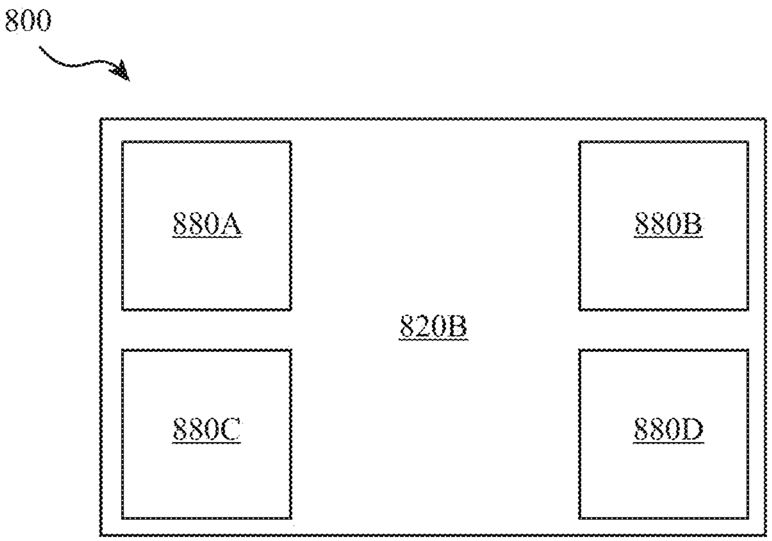
FIG. 8 illustrates a plan view of a portion of an example touch sensor panel stack-up according to examples of the disclosure.

FIG. 8 illustrates a plan view of a portion of an example touch sensor panel stack-up 800 according to examples of the disclosure. As shown, touch sensor panel stack-up 800 (e.g., similar to touch sensor panel stack-up 700) can include a conductive layer 820B (e.g., similar to conductive layer 720B in FIG. 7C) and a plurality of force electrodes (e.g., similar to force electrodes 776B in FIG. 7C). In some instances, the plurality of force electrodes can include two or more force sensing regions. For example, the plurality of force electrodes can include a first plurality of force electrodes such as force electrodes 880A, a second plurality of force electrodes such as force electrodes 880B, a third plurality of force electrodes such as force electrodes 880C, and a fourth plurality of force electrodes such as force electrodes 880D, as shown in FIG. 8. In some instances, the remaining area of conductive layer 820B (e.g., the area of conductive layer 820B unused or unoccupied by force electrodes 880A-D) can be used, for example, for grounding (e.g., as described with reference to ground electrodes 674 and/or ground electrodes 774 in FIGS. 6C and 7C, respectively), and bonding (e.g., with other components of touch sensor panel stack-up 800), such as described with reference to FIGS. 5, 6A-6C, and/or 7A-7C. Advantageously, using two or more force sensing regions can improve a granularity of the force-sensing capability of touch sensor panel stack-up 800 (e.g., relative to that of touch sensor panel stack-up 700).

Figure 9:
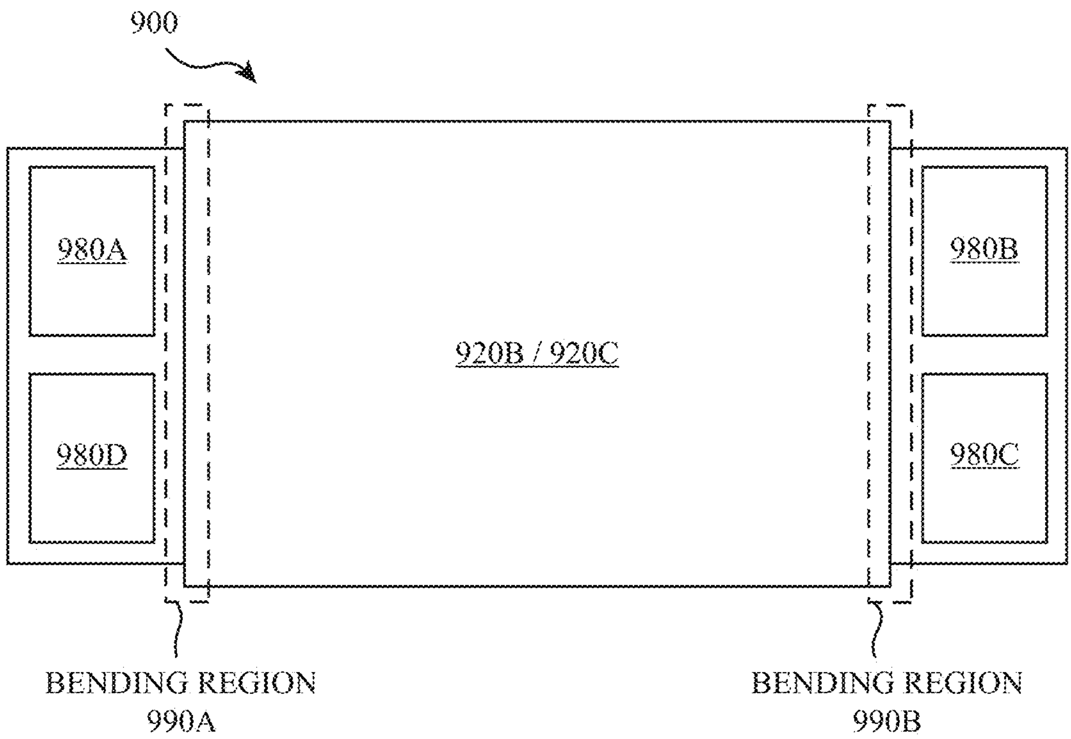
FIG. 9 illustrates a plan view of a portion of an example touch sensor panel stack-up according to examples of the disclosure.

FIG. 9 illustrates a plan view of a portion of an example touch sensor panel stack-up 900 according to examples of the disclosure. As shown, touch sensor panel stack-up 900 (e.g., similar to touch sensor panel stack-up 800) can include a conductive layer such as conductive layer 920B (e.g., similar to conductive layer 820B) and a plurality of force electrodes 980A-980D (e.g., similar to force electrodes 776B and/or force electrodes 880B in FIGS. 7C and 8, respectively). In some instances, the plurality of force electrodes can include two or more force sensing regions (e.g., force electrodes 980A, force electrodes 980B, force electrodes 980C, and force electrodes 980D), similar to the two or more force sensing regions discussed with reference to FIG. 8. In some instances, touch sensor panel stack-up 900 can include one or more bending regions such as bending region 990A and/or bending region 990B.

In some instances, an electronic device includes an energy storage device, wireless communication circuitry, a display, and the touch sensor panel stack-up (e.g., touch sensor panel stack-up 600, touch sensor panel stack-up 700, touch sensor panel stack-up 800, touch sensor panel stack-up 900) according to the examples of the disclosure.

Therefore, according to the above, some examples of the disclosure are directed to a touch sensor panel. The touch sensor panel can include a substrate, a plurality of conductive layers including a first conductive layer and a second conductive layer, a plurality of vias from the first conductive layer to the second conductive layer, and control circuitry mounted to a printed circuit. Additionally or alternatively to one or more of the examples disclosed above, in some examples, the control circuitry can include touch sensing circuitry. Additionally or alternatively to one or more of the examples disclosed above, in some examples, the first conductive layer can include a plurality of touch electrodes. Additionally or alternatively to one or more of the examples disclosed above, in some examples, the second conductive layer can be separated from the substrate by at least the first conductive layer and can include a bonding region with a plurality of bond pads for interconnection with the plurality of touch electrodes. Additionally or alternatively to one or more of the examples disclosed above, in some examples, the printed circuit can be separated from the substrate by at least the plurality of conductive layers and can be bonded to the plurality of bond pads by a conductive bonding material between the second conductive layer and the printed circuit.

Additionally or alternatively to one or more of the examples disclosed above, in some examples, the plurality of touch electrodes can be interconnected with the touch sensing circuitry through the plurality of vias and the plurality of bond pads. Additionally or alternatively to one or more of the examples disclosed above, in some examples, the plurality of conductive layers can further include a third conductive layer between the first conductive layer and the second conductive layer. Additionally or alternatively to one or more of the examples disclosed above, in some examples, the plurality of touch electrodes can include a first plurality of touch electrodes, the second conductive layer can include a plurality of force electrodes and a grounding region with one or more ground electrodes, and the third conductive can layer include a second plurality of touch electrodes. Additionally or alternatively to one or more of the examples disclosed above, in some examples, the second conductive layer can include a grounding region with one or more ground electrodes, and the third conductive layer can include a plurality of force electrodes. Additionally or alternatively to one or more of the examples disclosed above, in some examples, the plurality of vias from the first conductive layer to the second conductive layer can include a first plurality of vias from the first conductive layer to the third conductive layer, and a second plurality of vias from the second conductive layer to the third conductive layer. Additionally or alternatively to one or more of the examples disclosed above, in some examples, the second conductive layer can include a plurality of force electrodes and a grounding region with one or more ground electrodes. Additionally or alternatively to one or more of the examples disclosed above, in some examples, the plurality of conductive layers can include one or more silver nanowire electrodes formed in the first conductive layer. Additionally or alternatively to one or more of the examples disclosed above, in some examples, the plurality of conductive layers can include one or more carbon electrodes formed in the second conductive layer. Additionally or alternatively to one or more of the examples disclosed above, in some examples, the conductive bonding material can include an anisotropic conductive film, an anisotropic conductive adhesive, or an anisotropic conductive paste. Additionally or alternatively to one or more of the examples disclosed above, in some examples, the substrate can include polyethylene terephthalate. Additionally or alternatively to one or more of the examples disclosed above, in some examples, the touch sensor panel can further include a plurality of insulating layers including a first insulating layer between the first conductive layer and the second conductive layer, and a second insulating layer between the second conductive layer and the printed circuit. Additionally or alternatively to one or more of the examples disclosed above, in some examples, the touch sensor panel can further include one or more stiffeners at least partially in the same layer as the printed circuit. Additionally or alternatively to one or more of the examples disclosed above, in some examples, the touch sensor panel can further include one or more stiffeners, in which the plurality of touch electrodes can define an active touch sensing area having a first surface area, and the one or more stiffeners can define a stiffening area having a second surface area less than the first surface area. Additionally or alternatively to one or more of the examples disclosed above, in some examples, the touch sensor panel can further include a passivation layer and an adhesive layer between the printed circuit by the second conductive layer. Additionally or alternatively to one or more of the examples disclosed above, in some examples, the touch sensor panel can further include a plurality of insulating layers. Additionally or alternatively to one or more of the examples disclosed above, in some examples, a combined thickness of the substrate, the plurality of conductive layers, and the plurality of insulating layers can be between 140 and 155 microns (or less than 140 microns).

Some examples of the disclosure are directed to a touch and force sensor panel. Additionally or alternatively to one or more of the examples disclosed above, in some examples, the touch and force sensor panel can include a substrate, a plurality of conductive layers including a first conductive layer, a second conductive layer, and a third conductive layer, a plurality of vias from the first conductive layer and the third conductive layer to the second conductive layer, and control circuitry mounted to a printed circuit. Additionally or alternatively to one or more of the examples disclosed above, in some examples, the control circuitry can include touch sensing circuitry and force sensing circuitry. Additionally or alternatively to one or more of the examples disclosed above, in some examples, the first conductive layer can include a plurality of touch electrodes. Additionally or alternatively to one or more of the examples disclosed above, in some examples, the second conductive layer can be separated from the substrate by the first conductive layer and the third conductive layer. Additionally or alternatively to one or more of the examples disclosed above, in some examples, the second conductive layer can include a bonding region with a plurality of bond pads for interconnection with the plurality of touch electrodes. Additionally or alternatively to one or more of the examples disclosed above, in some examples, the printed circuit can be separated from the substrate by at least the plurality of conductive layers and can be bonded to the plurality of bond pads by a conductive bonding material between the second conductive layer and the printed circuit. Additionally or alternatively to one or more of the examples disclosed above, in some examples, the plurality of touch electrodes is a first plurality of touch electrodes can include a first plurality of touch electrodes, and the second conductive layer can include a plurality of force electrodes and a grounding region with one or more ground electrodes. Additionally or alternatively to one or more of the examples disclosed above, in some examples, the third conductive layer can include a second plurality of touch electrodes. Additionally or alternatively to one or more of the examples disclosed above, in some examples, the second conductive layer can include a grounding region with one or more ground electrodes, and the third conductive layer can include a plurality of force electrodes.

Some examples of the disclosure are directed to an electronic device. Additionally or alternatively to one or more of the examples disclosed above, in some examples, the electronic device can include an energy storage device, wireless communication circuitry, a display, and a touch sensor panel according to some examples of the disclosure. Additionally or alternatively to one or more of the examples disclosed above, in some examples, the electronic device can include an energy storage device, wireless communication circuitry, a display, and a touch and force sensor panel according to some examples of the disclosure.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel, comprising:

a substrate;

a plurality of conductive layers including a first conductive layer and a second conductive layer;

a plurality of vias from the first conductive layer to the second conductive layer; and control circuitry mounted to a printed circuit;

wherein:

the control circuitry includes touch sensing circuitry;

the first conductive layer includes a plurality of touch electrodes;

the touch sensor panel includes a plurality of force electrodes disposed on a layer of the plurality of conductive layers different than the first conductive layer;

the second conductive layer is separated from the substrate by at least the first conductive layer and includes a bonding region with a plurality of bond pads for interconnection with the plurality of touch electrodes; and the printed circuit is separated from the substrate by at least the plurality of conductive layers and is bonded to the plurality of bond pads by a conductive bonding material between the second conductive layer and the printed circuit.

2. The touch sensor panel of claim 1, wherein the plurality of touch electrodes is interconnected with the touch sensing circuitry through the plurality of vias and the plurality of bond pads.

3. The touch sensor panel of claim 1, wherein the plurality of conductive layers further comprises a third conductive layer between the first conductive layer and the second conductive layer.

4. The touch sensor panel of claim 3, wherein the plurality of touch electrodes is a first plurality of touch electrodes;

the second conductive layer includes the plurality of force electrodes and a grounding region with one or more ground electrodes; and the third conductive layer includes a second plurality of touch electrodes.

5. The touch sensor panel of claim 3, wherein the second conductive layer includes a grounding region with one or more ground electrodes; and the third conductive layer includes the plurality of force electrodes.

6. The touch sensor panel of claim 3, wherein the plurality of vias from the first conductive layer to the second conductive layer include a first plurality of vias from the first conductive layer to the third conductive layer and a second plurality of vias from the second conductive layer to the third conductive layer.

7. The touch sensor panel of claim 1, wherein the second conductive layer includes the plurality of force electrodes and a grounding region with one or more ground electrodes.

8. The touch sensor panel of claim 1, wherein the plurality of conductive layers includes one or more silver nanowire electrodes formed in the first conductive layer.

9. The touch sensor panel of claim 1, wherein the plurality of conductive layers includes one or more carbon electrodes formed in the second conductive layer.

10. The touch sensor panel of claim 1, wherein the conductive bonding material includes an anisotropic conductive film, an anisotropic conductive adhesive, or an anisotropic conductive paste.

11. The touch sensor panel of claim 1, wherein the substrate includes polyethylene terephthalate.

12. The touch sensor panel of claim 1, further comprising a plurality of insulating layers including a first insulating layer between the first conductive layer and the second conductive layer, and a second insulating layer between the second conductive layer and the printed circuit.

13. The touch sensor panel of claim 1, further comprising one or more stiffeners at least partially in the same layer as the printed circuit.

14. The touch sensor panel of claim 1, further comprising:

one or more stiffeners;

wherein:

the plurality of touch electrodes defines an active touch sensing area having a first surface area; and the one or more stiffeners defines a stiffening area having a second surface area less than the first surface area.

15. The touch sensor panel of claim 1, further comprising a passivation layer and an adhesive layer between the printed circuit and the second conductive layer.

16. The touch sensor panel of claim 1, further comprising:

a plurality of insulating layers;

wherein:

a combined thickness of the substrate, the plurality of conductive layers, and the plurality of insulating layers is between 140 and 155 microns.

17. A touch and force sensor panel, comprising:

a substrate;

a plurality of conductive layers including a first conductive layer, a second conductive layer, and a third conductive layer;

a plurality of vias from the first conductive layer and the third conductive layer to the second conductive layer; and control circuitry mounted to a printed circuit;

wherein:

the control circuitry includes touch sensing circuitry and force sensing circuitry;

the first conductive layer includes a plurality of touch electrodes;

the touch and force sensor panel includes a plurality of force electrodes disposed on a layer of the plurality of conductive layers different than the first conductive layer;

the second conductive layer is separated from the substrate by the first conductive layer and the third conductive layer, and includes a bonding region with a plurality of bond pads for interconnection with the plurality of touch electrodes; and the printed circuit is separated from the substrate by at least the plurality of conductive layers and is bonded to the plurality of bond pads by a conductive bonding material between the second conductive layer and the printed circuit.

18. The touch and force sensor panel of claim 17, wherein:

the plurality of touch electrodes is a first plurality of touch electrodes;

the second conductive layer includes the plurality of force electrodes and a grounding region with one or more ground electrodes; and the third conductive layer includes a second plurality of touch electrodes.

19. The touch and force sensor panel of claim 17, wherein:

the second conductive layer includes a grounding region with one or more ground electrodes; and the third conductive layer includes the plurality of force electrodes.

20. An electronic device, comprising:

an energy storage device;

wireless communication circuitry;

a display; and a touch sensor panel, comprising:

a substrate;

a plurality of conductive layers including a first conductive layer and a second conductive layer;

a plurality of vias from the first conductive layer to the second conductive layer; and control circuitry mounted to a printed circuit;

wherein:

the control circuitry includes touch sensing circuitry;

the first conductive layer includes a plurality of touch electrodes;

the touch sensor panel includes a plurality of force electrodes disposed on a layer of the plurality of conductive layers different than the first conductive layer;

the second conductive layer is separated from the substrate by at least the first conductive layer and includes a bonding region with a plurality of bond pads for interconnection with the plurality of touch electrodes; and the printed circuit is separated from the substrate by at least the plurality of conductive layers and is bonded to the plurality of bond pads by a conductive bonding material between the second conductive layer and the printed circuit.

* * * * *